US012579261B2

(12) United States Patent
Ezrielev et al.

(10) Patent No.: US 12,579,261 B2
(45) Date of Patent: Mar. 17, 2026

(54) MANAGING INFERENCE MODELS IN VIEW OF RECONSTRUCTABILITY OF SENSITIVE INFORMATION

(71) Applicant: Dell Products L.P., Round Rock, TX (US)

(72) Inventors: Ofir Ezrielev, Beer Sheva (IL); Tomer Kushnir, Omer (IL); Amihai Savir, Newton, MA (US)

(73) Assignee: Dell Products L.P., Round Rock, TX (US)

( * ) Notice: Subject to any disclaimer, the term of this patent is extended or adjusted under 35 U.S.C. 154(b) by 140 days.

(21) Appl. No.: 18/678,569

(22) Filed: May 30, 2024

(65) Prior Publication Data

US 2025/0371142 A1 Dec. 4, 2025

(51) Int. Cl.
*G06F 21/55* (2013.01)
*G06F 21/62* (2013.01)

(52) U.S. Cl.
CPC ........ *G06F 21/554* (2013.01); *G06F 21/6218* (2013.01); *G06F 2221/034* (2013.01)

(58) Field of Classification Search
CPC .............. G06F 21/554; G06F 21/6218; G06F 2221/034
See application file for complete search history.

(56) References Cited

U.S. PATENT DOCUMENTS

| | | | | |
|---|---|---|---|---|
| 12,216,758 B2 * | 2/2025 | Liu | ..................... | G06F 21/6245 |
| 2020/0059481 A1 * | 2/2020 | Sekar | ................. | H04L 63/1425 |
| 2023/0216691 A1 | 7/2023 | Li | | |

OTHER PUBLICATIONS

Borji, Ali, "A fresh perspective on machine unlearning, with a real-world solution!" Medium, Oct. 11, 2023, Web Page <https://medium.com/@aliborji/a-fresh-perspective-on-machine-unlearning-with-a-real-world-solution-203821dd01c0> accessed on May 29, 2024 (14 Pages).

Sekhari, Ayush, et al. "Remember what you want to forget: Algorithms for machine unlearning." Advances in Neural Information Processing Systems 34 (2021): 18075-18086 (12 Pages).

Shaik, Thanveer, et al. "Exploring the landscape of machine unlearning: A survey and taxonomy." arXiv preprint arXiv:2305.06360 (2023) (24 Pages).

(Continued)

*Primary Examiner* — Farid Homayounmehr
*Assistant Examiner* — Judy Bazna
(74) *Attorney, Agent, or Firm* — WOMBLE BOND DICKINSON (US) LLP

(57) ABSTRACT

Methods, systems, and devices for providing computer-implemented services are disclosed. To provide the computer-implemented services, inference models may be deployed to locations. Prior to deploying an inference model to a location, it may be determined whether the location is trustworthy. If the location is determined to not be trustworthy, an input data attack resistant inference model may be selected and deployed. The input data attack resistant inference model may be trained to impart reconstruction resistance to sensitive information during inference generation based on a schema for weighting the sensitive information for reconstruction resistance. The training process may decrease a likelihood of the inferences generated by the input data attack resistant inference model being usable to reconstruct the sensitive information.

20 Claims, 14 Drawing Sheets

(56)        References Cited

OTHER PUBLICATIONS

Bharati, Subrato, et al. "Federated learning: Applications, challenges and future directions." International Journal of Hybrid Intelligent Systems 18.1-2 (2022): 19-35. (35 Pages).

Liu, Yang, et al. "Vertical Federated Learning: Concepts, Advances, and Challenges." IEEE Transactions on Knowledge and Data Engineering (2024) (20 Pages).

Gabrielli, Edoardo, Giovanni Pica, and Gabriele Tolomei. "A survey on decentralized federated learning." arXiv preprint arXiv:2308.04604 (2023) (31 Pages).

Holohan, Naoise. "Random Number Generators and Seeding for Differential Privacy." arXiv preprint arXiv:2307.03543 (2023).

Bornman, Nicholas, et al., "Random number generation and distribution out of thin (or thick) air." Journal of Optics 22.7 (2020): 075705 (18 Pages).

Franco, Javier, et al. "A survey of honeypots and honeynets for internet of things, industrial internet of things, and cyber-physical systems." IEEE Communications Surveys & Tutorials 23.4 (2021): 2351-2383 (34 Pages).

Ardito, Cesare G. "Contra generative AI detection in higher education assessments." arXiv preprint arXiv:2312.05241 (2023) (20 Pages).

Caiado, Antŏnio Junior Alves, and Michael Hahsler. "AI Content Self-Detection for Transformer-based Large Language Models." arXiv preprint arXiv:2312.17289 (2023) (12 Pages).

Weber-Wulff, Debora, et al. "Testing of detection tools for AI-generated text." International Journal for Educational Integrity 19.1 (2023): 26. (46 Pages).

Quidwai, Mujahid Ali, et al., "Beyond black box ai-generated plagiarism detection: From sentence to document level." arXiv preprint arXiv:2306.08122 (2023) (9 Pages).

Ren, Jie, et al. "Copyright Protection in Generative AI: A Technical Perspective." arXiv preprint arXiv:2402.02333 (2024) (33 Pages).

Zhong, Haonan, et al. "Copyright protection and accountability of generative ai: Attack, watermarking and attribution." Companion Proceedings of the ACM Web Conference 2023. 2023 (5 Pages).

* cited by examiner

Neural
Network 200

Input Layer 202

Hidden Layer 204

Output Layer 206

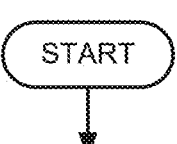

START

Obtain a multipath inference model including a first inference
generation path that includes a prediction head portion and a shared
body portion and a second inference generation path that includes a
reconstruction head portion and the shared body portion
Operation 320

Obtain a set of reconstruction score thresholds using a schema for
weighting, at least, input features for reconstruction resistance
Operation 322
Refer to FIG. 3C Perform an untraining process for the second inference generation
path to reduce a reconstruction score for the second inference
generation path and to update the shared body portion
Operation 324
Refer to FIG. 3D Perform a first training process for the first inference generation path
while the updated shared body portion is frozen to obtain an updated
prediction head portion
Operation 326

Use the updated prediction head portion and the updated shared
body portion as the input data attack resistant inference model
Operation 328

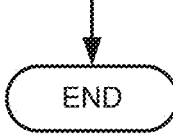

END

FIG. 3B

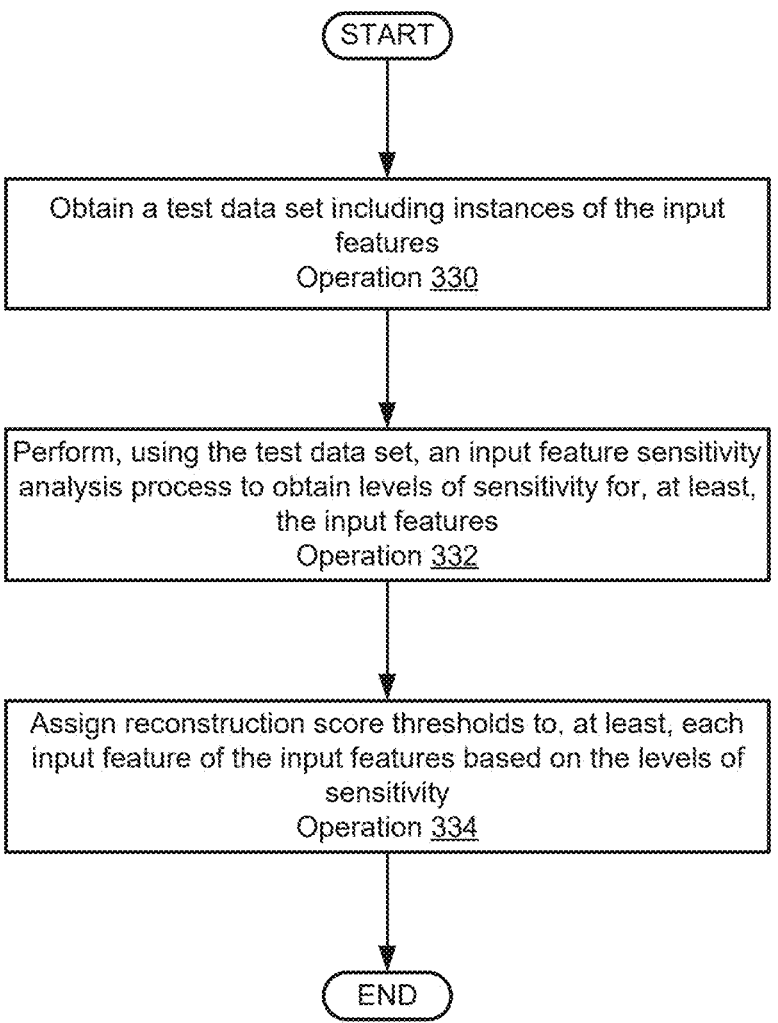

START

Obtain a test data set including instances of the input features
Operation 330

Perform, using the test data set, an input feature sensitivity analysis process to obtain levels of sensitivity for, at least, the input features
Operation 332

Assign reconstruction score thresholds to, at least, each input feature of the input features based on the levels of sensitivity
Operation 334

END

FIG. 3C

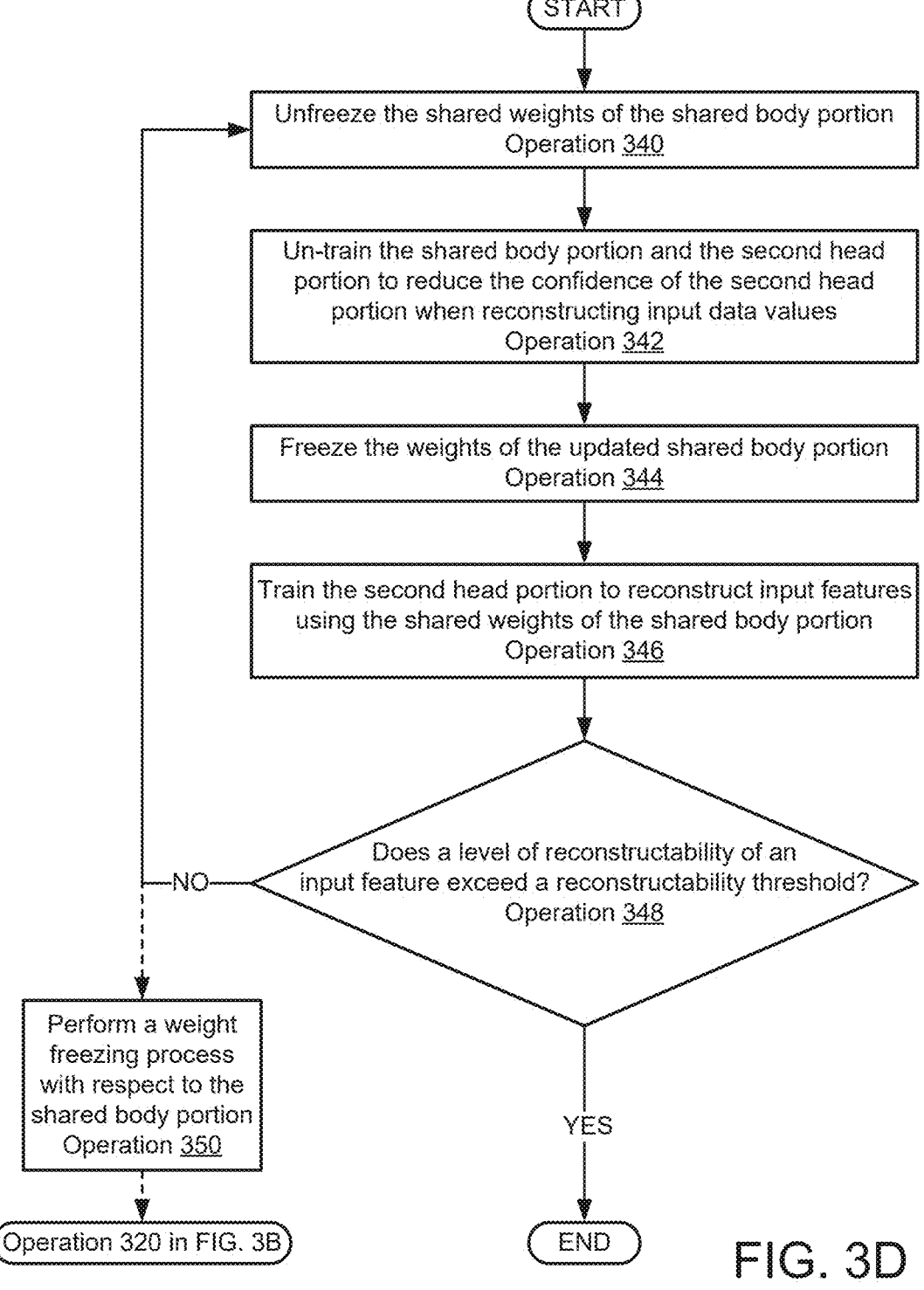

START

Unfreeze the shared weights of the shared body portion
Operation 340

Un-train the shared body portion and the second head
portion to reduce the confidence of the second head
portion when reconstructing input data values
Operation 342

Freeze the weights of the updated shared body portion
Operation 344

Train the second head portion to reconstruct input features
using the shared weights of the shared body portion
Operation 346

Does a level of reconstructability of an
input feature exceed a reconstructability threshold?
Operation 348

NO

Perform a weight
freezing process
with respect to the
shared body portion
Operation 350

Operation 320 in FIG. 3B

YES

END

FIG. 3D

MANAGING INFERENCE MODELS IN VIEW OF RECONSTRUCTABILITY OF SENSITIVE INFORMATION

FIELD

Embodiments disclosed herein relate generally to managing use of inference models. More particularly, embodiments disclosed herein relate to systems and methods to manage inference models in view of reconstructability of sensitive information.

BACKGROUND

Computing devices may provide computer-implemented services. The computer-implemented services may be used by users of the computing devices and/or devices operably connected to the computing devices. The computer-implemented services may be performed with hardware components such as processors, memory modules, storage devices, and communication devices. The operation of these components may impact the performance of the computer-implemented services.

BRIEF DESCRIPTION OF THE DRAWINGS

Embodiments disclosed herein are illustrated by way of example and not limitation in the figures of the accompanying drawings in which like references indicate similar elements.

FIGS. 3A-3D show flow diagrams illustrating methods for managing use of inference models in accordance with an embodiment.

DETAILED DESCRIPTION

Figure 1:
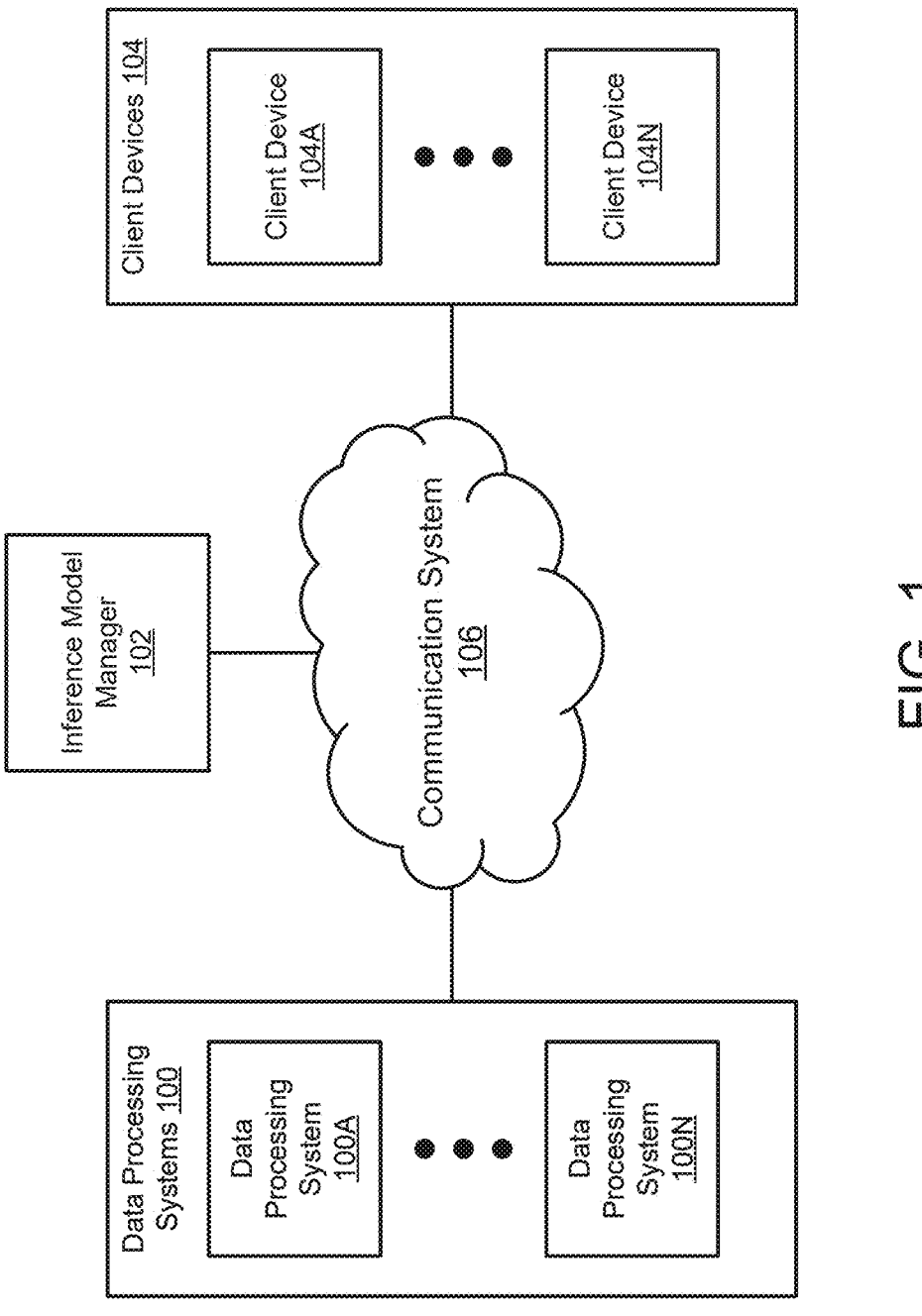
FIG. 1 shows a block diagram illustrating a system in accordance with an embodiment.

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing use of inference models. Inferences generated by the inference models may be used to provide computer-implemented services. The computer-implemented services may include any quantity and type of such services.

To generate the inferences and provide, at least in part, the computer-implemented services, the inference model may be deployed to a location where the inferences are desired to be generated. However, the location may be vulnerable to compromise by unauthorized entities (e.g., malicious entities) that may attempt to gain access to the inferences, the input data, derived data based on at least a portion of the input data, and/or other information that may be sensitive (e.g., private, confidential, otherwise negatively impactful if exposed). The location may be vulnerable to compromise due to: (i) potential compromise of hardware resources of data processing systems at the location, (ii) network security concerns, (iii) differing data privacy regulations, and/or (iv) other reasons.

To provide the computer-implemented services while reducing a likelihood that sensitive information (e.g., the input features, the portions of the derived data) may be reconstructed (e.g., inferred) by unauthorized entities, an input data attack resistant inference model may be deployed and used to perform inference generation. The input data attack resistant inference model may be trained to generate inferences that are less likely to be usable to infer portions of the sensitive information when compared to an inference model that is not input data attack resistant. Therefore, the sensitive information may be less likely to be compromised by the unauthorized entities.

The input data attack resistant inference model may be implemented by deploying a first portion (e.g., a shared body portion) to a first location that is trustworthy and a second portion (e.g., a prediction head portion) to a location that is determined to not be trustworthy. Therefore, the input data may be ingested by the shared body portion at the trustworthy location and an output from the shared body portion may be provided to the second location for ingestion by the prediction head portion. The prediction head portion may then generate inferences usable to provide the computer-implemented services.

The shared body portion and the prediction head portion may be trained to impart reconstruction resistance to portions of the sensitive information based on levels of sensitivity of the portions of the sensitive information. For example, a level of sensitivity of an input feature may be based on a level of impact of undesired access to the input feature (e.g., a level of risk associated with potential compromise of the input feature by a malicious entity). Therefore, during training, the input data attack resistant inference model may be trained to impart higher levels of reconstruction resistant to portions of the sensitive information that are assigned higher levels of sensitivity.

Doing so may selectively reduce reconstructability of portions of the sensitive information and, therefore, may reduce a likelihood that the portions of the sensitive information may be compromised by malicious entities using at least the inferences. Consequently, a quality and/or reliability of the computer-implemented services provided based on the inferences may be increased.

In an embodiment, a method for managing use of inference models is provided. The method may include: identifying an occurrence of an inference model deployment event for a location; based on the occurrence, making a determination regarding whether the location is trustworthy; in a first instance of the determination in which the location is not trustworthy: selecting, from a model repository, an input data attack resistant inference model, the input data attack resistant inference model being trained to impart reconstruction resistance to, at least, input features during inference generation based on a schema for weighting, at least, the input features for reconstruction resistance; initiating deployment of a prediction head portion of the input data attack resistant inference model to the location and a shared body portion of the input data attack resistant inference model to a second location that is trustworthy; obtaining, at the location, an inference model result using the prediction head portion and the shared body portion; and providing computer-implemented services based on the inference model result.

The schema for weighting, at least, the input features for reconstruction resistance may indicate a reconstruction score threshold for an input feature of the input features based on a level of sensitivity for the input feature, the level of sensitivity being based on a level of impact of undesired access to the input feature.

The reconstruction score threshold may indicate an acceptable degree of reconstructability for the input feature and the reconstruction score threshold may decrease as the level of sensitivity for the input feature increases.

The level of sensitivity may increase as information content of the input feature increases.

The information content may be based on at least one of variability of the input feature, and public accessibility of information regarding the input feature.

The schema for weighting, at least, the input features for reconstruction resistance may indicate a reconstruction score threshold for a portion of derived data based on at least one of the input features.

The portion of the derived data may not be used as input to the input data attack resistant inference model and may not be output by the input data attack resistant inference model.

The method may also include: prior to identifying the occurrence of the inference model deployment event: obtaining a multipath inference model comprising: a first inference generation path comprising the prediction head portion and the shared body portion; and a second inference generation path comprising a reconstruction head portion and the shared body portion, the second inference generation path being trained to infer input features ingested by the second inference generation path; obtaining, using the schema, a set of reconstruction score thresholds associated with at least the input features; performing, based on the set of the reconstruction score thresholds, an untraining process for the second inference generation path to reduce an ability of the second inference generation path to infer the input features and to update the shared body portion; performing a first training process for the first inference generation path while the updated shared body portion is frozen to obtain an updated prediction head portion; and using the updated prediction head portion and the updated shared body portion as the input data attack resistant inference model.

Obtaining the multipath inference model may include: freezing the shared body portion; and while the shared body portion is frozen: performing a second training process using a second training data set to obtain the second inference generation path.

While the shared body portion is frozen, values of weights of hidden layers of the shared body portion may not be modified during the second training process.

The values of the weights of the hidden layers of the shared body portion may be set during a previously performed training process completed prior to the shared body portion being frozen and the previously performed training process using a first training data set to obtain the first inference generation path.

Obtaining the set of the reconstruction score thresholds may include: obtaining a test data set comprising instances of the input features; performing, using the test data set, an input feature sensitivity analysis process to obtain the levels of sensitivity for, at least, the input features; and assigning reconstruction score thresholds to, at least, each input feature of the input features based on the levels of sensitivity.

Performing the untraining process may include: performing a third training process using a second training data set to obtain an updated shared body portion and to reduce ability of the second inference generation path to infer, at least, the input features; freezing the updated shared body portion; and while the updated shared body portion is frozen: performing a fourth training process using the second training data set to increase the ability of the second inference generation path to infer, at least, the input features and obtain an updated reconstruction head portion.

Performing the untraining process may also include: making a determination, using the updated shared body portion and the updated reconstruction head portion, regarding whether a reconstruction score for a first input feature of the input features falls below a reconstruction score threshold associated with the first input feature; in an instance of the determination in which the reconstruction score falls below the reconstruction score threshold: concluding that the updated shared body portion is to be used to update the first inference generation path.

The second location may have access to input data for the inference model and the location may not have access to the input data.

The model repository may include: at least one input data attack resistant inference model; and at least one non-input data attack resistant inference model.

In an embodiment, a non-transitory media is provided that may include instructions that when executed by a processor cause the computer-implemented method to be performed.

In an embodiment, a data processing system is provided that may include the non-transitory media and a processor and may perform the computer-implemented method when the computer instructions are executed by the processor.

Turning to FIG. 1, a block diagram illustrating a system in accordance with an embodiment is shown. The system shown in FIG. 1 may provide computer-implemented services. The computer-implemented services may include, for example, database services, instant messaging services, and/or other types of computer-implemented services. The computer-implemented services may be provided by any number of data processing systems (e.g., 100). The data processing systems of data processing systems 100 may provide similar and/or different computer-implemented services. Data processing systems 100, client devices 104, and/or other devices (not shown) may utilize the computer-implemented services.

Inferences may be consumed during provision of the computer-implemented services. For example, the inferences may indicate content to be displayed as part of the computer-implemented services, how to perform certain actions, and/or may include other types of information used during performance of the computer-implemented services.

To obtain the inferences, one or more inference models (e.g., hosted by data processing systems and/or other devices operably connected to the data processing systems) may be used. The inference models may, for example, ingest input and may generate inferences based on the ingested input. The content of the ingested input and the inferences may depend on the goal of the respective inference model, the architecture of the inference model, and/or other factors.

As part of providing the computer-implemented services, inference models may be deployed (e.g., by inference model manager 102) to a data processing system (e.g., 100A) to perform inference generation. Input data for the inference model may also be obtained by data processing system 100A to use as ingest data for inference generation.

However, an unauthorized entity may attempt to gain access to input features of the input data, derived data based on at least one of the input features, and/or other information by performing a reconstruction process using at least the inferences. To do so, the unauthorized entity may attempt to compromise data processing system 100A, network communications between a second entity (e.g., client devices 104, data processing system 100B) and data processing system 100A that may include the inferences, etc.

In general, embodiments disclosed herein may provide methods, systems, and/or devices for providing inference model management services in a manner that reduces a likelihood of inferences being usable to reconstruct sensitive information (e.g., input features, portions of derived data based on at least one of the input features). Sensitive information may include any information identified as private, confidential, restricted for access, and/or otherwise negatively impactful if accessed by unauthorized entities. Consequently, the sensitive information may be less likely to be compromised by unauthorized entities while providing the computer-implemented services that consume the inferences.

To provide the inference model management services, a system in accordance with an embodiment may determine whether a location is trustworthy (e.g., may access sensitive input data). The location (e.g., including at least one data processing system) may not be considered trustworthy if the location is potentially vulnerable to compromise and/or if the location is subject to different data privacy regulations than an input data source location.

If the location is determined to not be trustworthy, an input data attack resistant inference model may be selected and deployed for use in inference generation. The input data attack resistant inference model may include at least two portions: (i) a shared body portion and (ii) a prediction head portion. The input data attack resistant inference model may be trained to impart reconstruction resistance to portions of the sensitive information based on a schema for weighting the portions of the sensitive information for reconstruction resistance.

The shared body portion may be deployed to a trusted location (e.g., a source of the input data, another data processing system trusted to access the input data) and the prediction head portion may be deployed to the location that is not trustworthy. The input data may be ingested by the shared body portion via any number of input layers of the shared body portion. The shared body portion may then generate a partially processed inference model result (e.g., an output from any number of hidden layers of the shared body portion and the partially processed inference model result may be provided to the location. At the location, the partially processed inference model result may be ingested by the prediction head portion and the prediction head portion may generate, via any number of output layers, an inference.

By doing so, inferences may be generated and utilized to provide computer-implemented services while decreasing a likelihood that the inferences may be used to reconstruct the portions of the sensitive information. Therefore, a quality, reliability, and/or availability of the computer-implemented services based on the inferences may be increased for users of client devices 104.

To provide the above noted functionality, the system may include data processing systems 100, inference model manager 102, client devices 104, and communication system 106. Each of these components is discussed below.

Client devices 104 may consume all, or a portion, of the computer-implemented services. For example, client device 104A may be operated by a user that uses database services, instant messaging services, and/or other types of services provided by data processing systems 100 and/or inference model manager 102.

Data processing systems 100 may include any number of data processing systems (e.g., 100A-100N). Data processing systems 100 may: (i) manage input data for inference models, (ii) host and/or operate inference models, (iii) make decisions and/or perform actions based on the inferences, and/or (iv) perform other actions to provide and/or participate in provision of the computer-implemented services to client devices 104 and/or other entities.

For example, a first data processing system (e.g., 100A) may be a device responsible for managing input data for an input data attack resistant inference model and may host a shared body portion of the input data attack resistant inference model. Data processing system 100A may feed the input data into the shared body portion of the input data attack resistant inference model to obtain a partially processed inference model result (e.g., an output from the shared body portion).

Data processing system 100A may then provide the partially processed inference model result to a second data processing system (e.g., 100B). Data processing system 100B may be a device that is not be trusted by data processing system 100A and/or may be located in a geographical location that is subject to different data privacy regulations than data processing system 100A.

Data processing system 100B may host and operate a prediction head portion of the input data attack resistant inference model. To do so, data processing system 100B may obtain the partially processed inference model result and may feed the partially processed inference model result into the prediction head portion to generate the inference. Data processing system 100B may: (i) store the inference, (ii) use the inference to make decisions, provide computer-implemented services based on the inference, and/or (iii) may communicate with client devices 104 based on the inference.

Inference model manager 102 may manage any number of inference models. To do so, inference model manager 102 may: (i) identify occurrences of inference model deployment events for locations, and/or (ii) determine whether the locations are trustworthy for inference model deployment. If the locations are determined to not be trustworthy, inference model manager 102 may: (i) select, from a model repository, an input data attack resistant inference model, (ii) initiate deployment of the input data attack resistant inference model, and/or (iii) perform other actions to facilitate provision of the computer-implemented services.

If the locations are determined to be trustworthy, inference model manager 102 may: (i) select, from the model repository, a non-input data attack resistant inference model (e.g., an inference model that is not input data attack resistant), (ii) initiate deployment of the non-input data attack resistant inference model, and/or (iii) perform other actions to facilitate provision of the computer-implemented services.

In addition, inference model manager 102 may manage the model repository and/or may manage training of inference models. To train the inference models, inference model manager 102 may train any number of input data attack resistant inference model and any number of inference models that are not input data attack resistant. Inference model manager 102 may store information related to the inference models (e.g., neural network architectures, weights) in the model repository.

To train an input data attack resistant inference model, inference model manager 102 may perform a modified split training process. To do so, a multipath inference model may be obtained. The multipath inference model may include: (i) a first inference generation path including a prediction head portion and a shared body portion and (ii) a second inference generation path including a reconstruction head portion and the shared body portion. The first inference generation path may be trained to generate inferences usable to provide a desired type and/or quantity of computer-implemented services. The second inference generation path may be trained to reconstruct portions of the sensitive information.

In a first example, the second inference generation path may be trained to reconstruct input features ingested by the second inference generation path. To do so, the second inference generation path may be trained using a training data set including input features (and/or internal representations based on input features in scenarios in which the shared body portion is frozen) and labels that include the input features.

In a second example, the second inference generation path may be trained to predict portions of derived data (e.g., statistical properties, aggregates of information) based on at least one of the input features. To do so, the second inference generation path may be trained using a training data set including input features (e.g., measurements obtained from a data collector and/or any other values to be used as ingest for an inference model) and labels that include portions of derived data.

Following training the second inference generation path, inference model manager 102 may: (i) obtain, using a schema for weighting the portions of the sensitive information for reconstruction resistance, a set of reconstruction score thresholds associated with the portions of the sensitive information, (ii) perform an untraining process for the second inference generation path to reduce an ability of the second inference generation path to infer the portions of the sensitive information (based on reconstruction score thresholds that correspond to the portions of the sensitive information) and to update the shared body portion, (ii) train the first inference generation path while the updated shared body portion is frozen to obtain an updated prediction head portion, (iii) use the updated prediction head portion and the updated shared body portion as the input data attack resistant inference model, and/or (iv) perform other actions. Refer to FIG. 2D and FIG. 3C for details regarding obtaining the reconstruction score thresholds.

The set of the reconstruction score thresholds may be used to perform the untraining process mentioned above. The untraining process may include any number of untraining cycles to progressively reduce the reconstructability of the portions of the sensitive information (e.g., to varying degrees based on the set of the reconstruction score thresholds). Following each untraining cycle, the second inference generation path may be tested to determine whether a reconstruction score for a portion of the sensitive information (e.g., a particular input feature, a particular portion of derived data) falls below a reconstruction score threshold corresponding to the portion of the sensitive information. This testing process may be repeated for any number of input features, portions of derived data, and/or other portions of the sensitive information.

If, for example, a reconstruction score for an input feature exceeds the reconstruction score threshold (e.g., is able to be reconstructed to an extent considered unacceptable), additional untraining cycles may be performed to reduce the reconstruction score for the input feature. Similar processes may be performed for each reconstruction score of the set of the reconstruction scores until the set of the reconstruction scores fall below their corresponding reconstruction score thresholds (at least to an extent considered acceptable by an entity managing training of input data attack resistant inference models).

Refer to FIGS. 3B-4C for additional details regarding training and untraining cycles for the input data attack resistant inference model.

When performing their functionality, client devices 104, inference model manager 102, and/or data processing systems 100 may perform all, or a portion, of the methods and/or actions described in FIGS. 2A-4C.

Data processing systems 100, inference model manager 102, and/or client devices 104 may be implemented using a computing device such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 5.

Any of the components illustrated in FIG. 1 may be operably connected to each other (and/or components not illustrated) with a communication system 106. In an embodiment, communication system 106 may include one or more networks that facilitate communication between any number of components. The networks may include wired networks and/or wireless networks (e.g., and/or the Internet). The networks may operate in accordance with any number and types of communication protocols (e.g., such as the internet protocol).

While illustrated in FIG. 1 as including a limited number of specific components, a system in accordance with an embodiment may include fewer, additional, and/or different components than those illustrated therein.

Figure 2A:
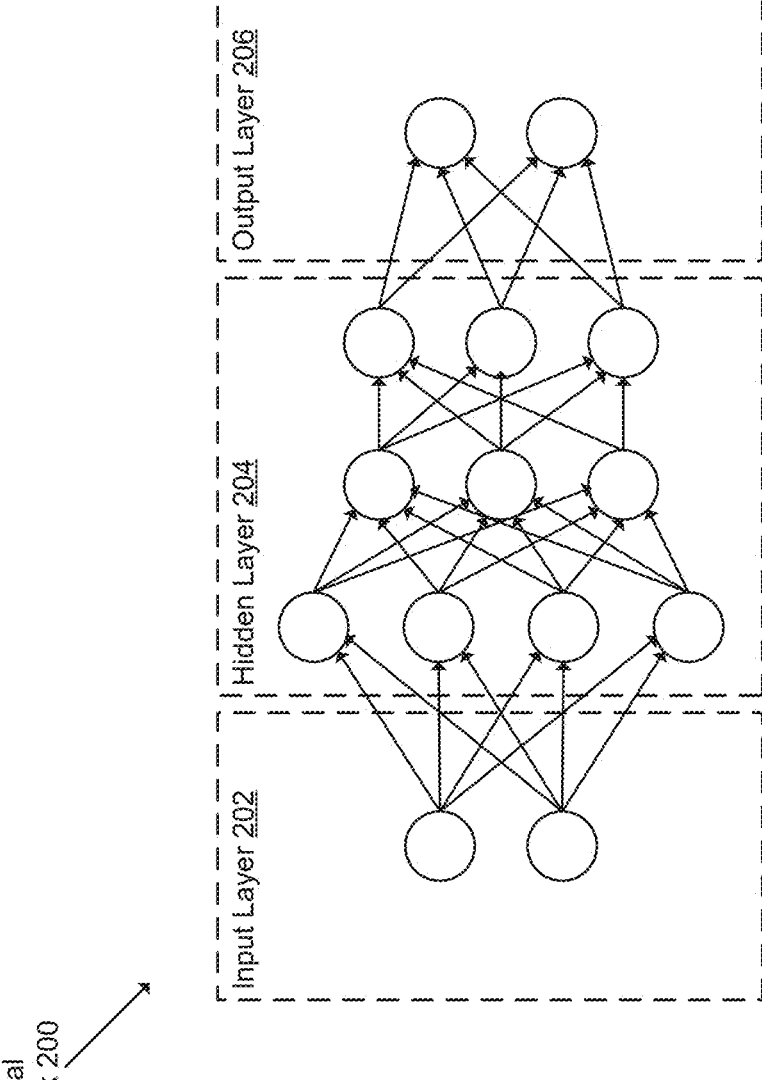
FIG. 2A shows a diagram illustrating a neural network in accordance with an embodiment.
Figure 2B:
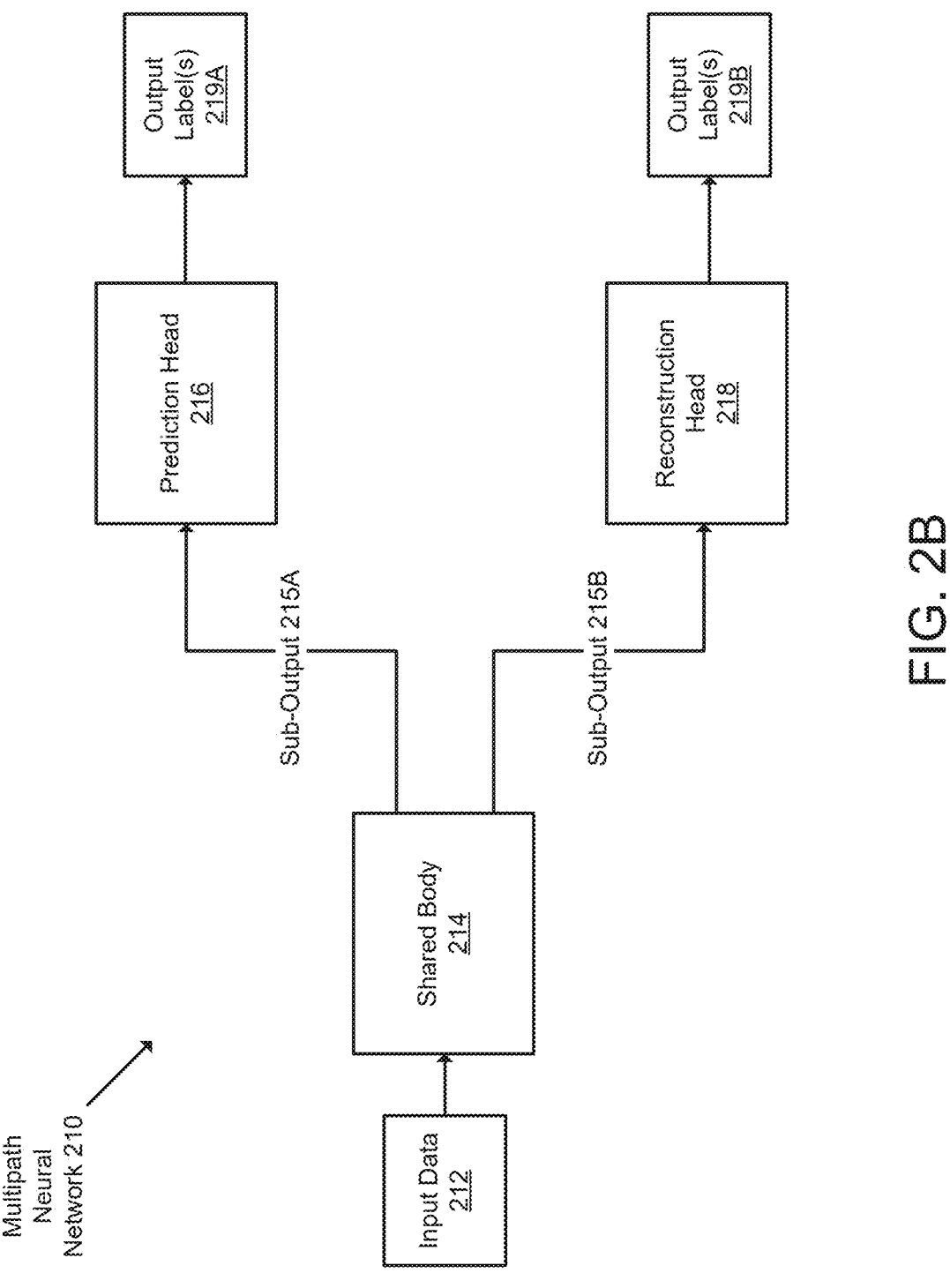
FIG. 2B-2C show diagrams illustrating a multipath neural network in accordance with an embodiment.
Figure 2C:
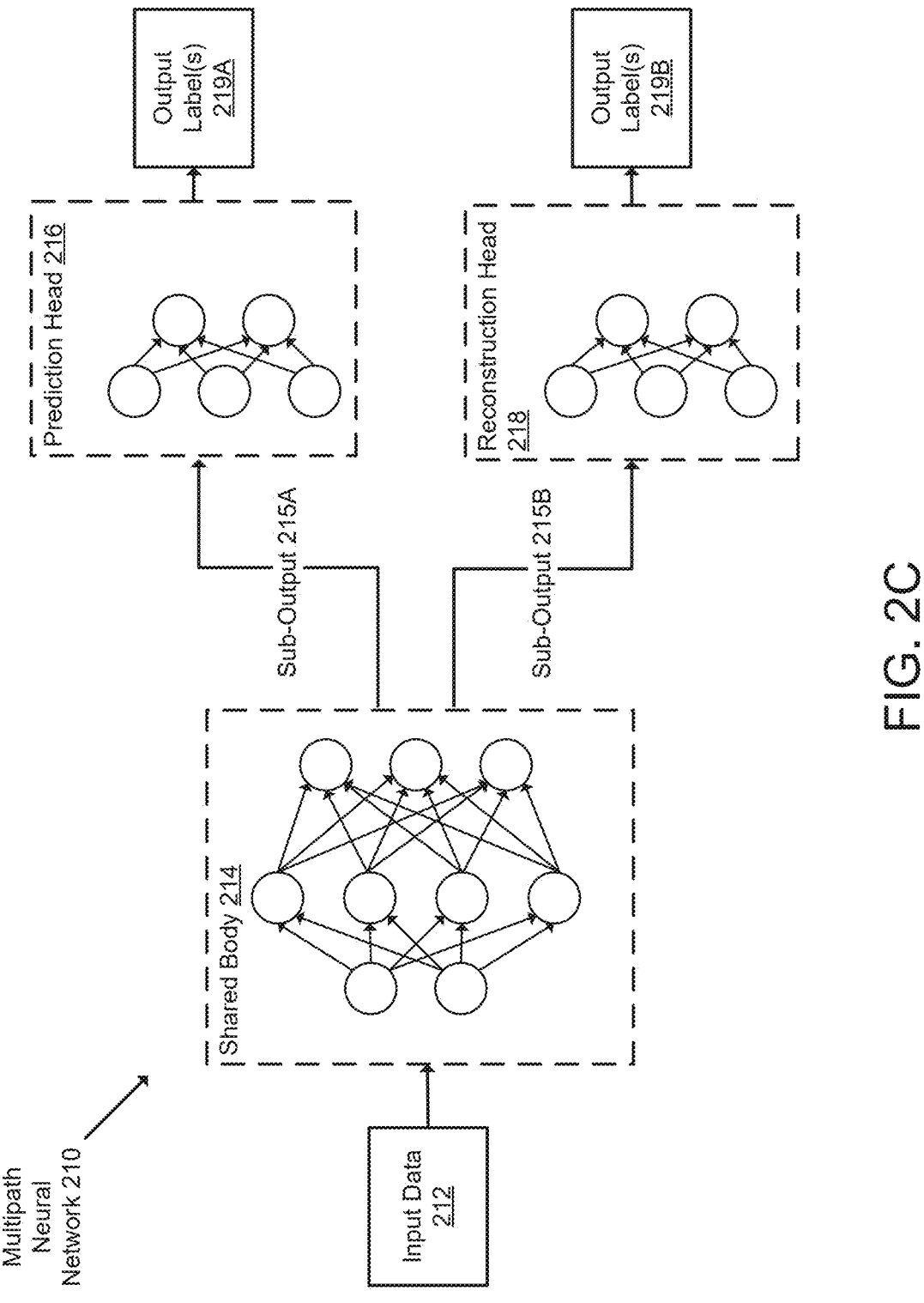
Figure 2D:
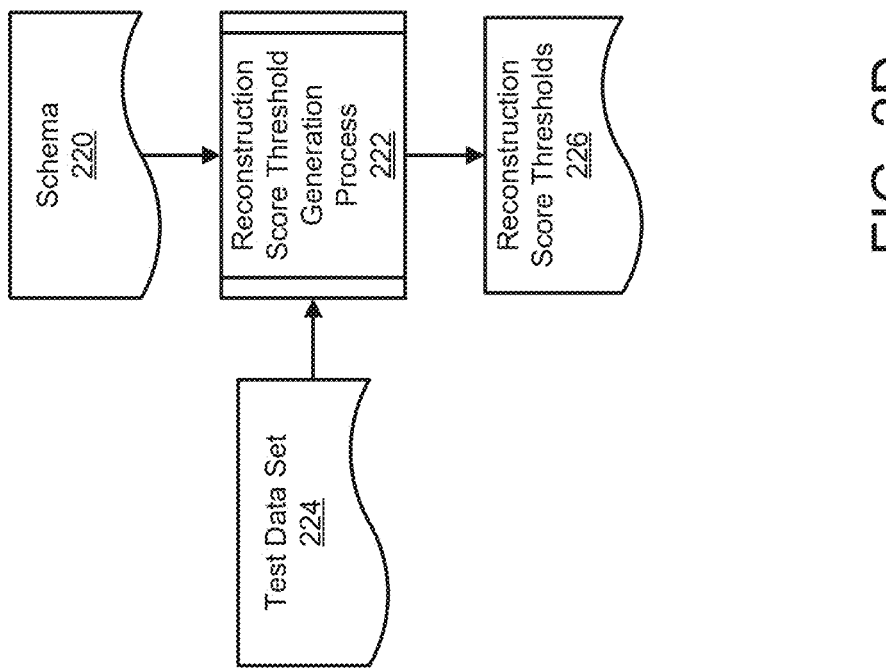
FIG. 2D shows a block diagram illustrating generation of a set of reconstruction score thresholds in accordance with an embodiment.

To further clarify embodiments disclosed herein, inference model diagrams in accordance with an embodiment are shown in FIGS. 2A-2C. The inference model diagrams may illustrate a structure of the inference models and/or how data is processed/used within the system of FIG. 1.

Turning to FIG. 2A, a diagram illustrating a neural network (e.g., an implementation of an inference model) in accordance with an embodiment is shown.

In FIG. 2A, neural network 200 may be similar to any inference model managed by inference model manager 102, discussed above. Neural network 200 may include a series of layers of nodes (e.g., neurons, illustrated as circles). This series of layers may include input layer 202, hidden layer 204 (which may include different sub-layers of neurons), and output layer 206. Lines terminating in arrows in this diagram indicate data relationships (e.g., weights). For example, numerical values calculated with respect to each of the neurons during operation of neural network 200 may depend on the values calculated with respect to other neurons linked by the lines (e.g., the weight associated with each line may impact the level of dependence of the value for a second neuron for the value for neuron from which the line initiates). The value calculated with respect to a first neuron may be based, at least in part, on the values of other neurons from which the arrows that terminate in the neuron initiate from.

Each of the layers of neurons of neural network 200 may include any number of neurons and may include any number of sub-layers.

Over time, inferences generated by neural network 200 may be obtained by a malicious entity. The malicious entity may attempt to use the inferences generated by neural network 200 to reconstruct portions of sensitive information (e.g., input features that were fed into neural network 200, derived data based on at least a portion of the input features). Therefore, if the malicious entity successfully (e.g., to an extent considered sufficient to compromise the data) reconstructs the portions of the sensitive information, the portions of the sensitive information may be exposed.

To decrease a likelihood that inferences generated by the inference model are usable to reconstruct the portions of the sensitive information, embodiments disclosed herein may provide a system and method for managing input data attack resistant inference models. To do so, the system may modify the architecture of neural network 200. Refer to FIGS. 2B-2C for additional details regarding these modifications to the architecture of neural network 200.

Turning to FIGS. 2B-2C, diagrams illustrating data structures and interactions within an inference model in accordance with an embodiment are shown.

In FIG. 2B, a diagram of multipath neural network 210 is shown. Multipath neural network 210 may be derived from neural network 200 shown in FIG. 2A. Multipath neural network 210 may be derived by (i) obtaining shared body 214 based on neural network 200 and (ii) adding two heads. The shared body and one head (e.g., prediction head 216) may be members of a first inference generation path and the shared body and other head (e.g., reconstruction head 218) may be members of a second inference generation path (it will be appreciated that other inference generation paths may be similarly obtained). Input data 212 may be any data to be ingested by multipath neural network 210.

Input data 212 may be ingested by shared body 214. Shared body 214 may include an input layer (e.g., input layer 202 of FIG. 2A) and one or more hidden layers (e.g., a portion of the sub-layers of hidden layer 204 of FIG. 2A).

During operation, shared body 214 may generate intermediate outputs (e.g., sub-output 215A-215B) to be consumed by the respective heads (e.g., 216, 218) of multipath neural network 210. The intermediate outputs may be partially processed inference model results.

Prediction head 216 may include some number of hidden layers (e.g., that include weights that depend on the values of nodes of shared body 214), and an output layer through which output label(s) 219A are obtained. Similarly, reconstruction head 218 may include some number of hidden layers (e.g., that include weights that depend on the values of nodes of shared body 214), and an output layer through which output label(s) 219B are obtained. Output label(s) 219A and 219B may include the inferences generated based on input data 212 by multipath neural network 210.

A first inference generation path may include shared body 214 and prediction head 216. This first inference generation path may, upon ingestion of input data 212, generate output label(s) 219A. The first inference generation path may attempt to make predictions as intended by neural network 200.

A second inference generation path may include shared body 214 and reconstruction head 218. This second inference generation path may, upon ingestion of input data 212, generate output label(s) 219B. In a first example, the second inference generation path may attempt to reconstruct input features of input data 212 to mimic a malicious entity's potential attempt to do so. In the first example, the second inference generation path may be trained using a training data set including input features and labels that include the input features. In a second example, the second inference generation path may attempt to predict portions of derived data using input features of input data 212 to mimic a malicious entity's potential attempt to do so. In the second example, the second inference generation path may be trained using a training data set including input features and labels including portions of derived data.

Any of shared body 214, prediction head 216, and reconstruction head 218 may include neurons. Refer to FIG. 2C for additional details regarding these neurons.

Turning to FIG. 2C, a diagram illustrating multipath neural network 210 in accordance with an embodiment is shown. As seen in FIG. 2C, shared body 214, prediction head 216, and reconstruction head 218 may each include layers of neurons. Each of shared body 214, prediction head 216, and reconstruction head 218 may include similar or different numbers and arrangements of neurons.

While not illustrated in FIG. 2C, the values for some of the neurons of prediction head 216 and reconstruction head 218 calculated during operation of multipath neural network 210 may depend on the values calculated for some of the neurons of shared body 214. These dependences (i.e., weights) are represented by sub-output 215A and sub-output 215B.

While illustrated in FIGS. 2A-2C as including a limited number of specific components, a neural network and/or multipath neural network may include fewer, additional, and/or different components than those illustrated in these figures without departing from embodiments disclosed herein.

Figure 2E:
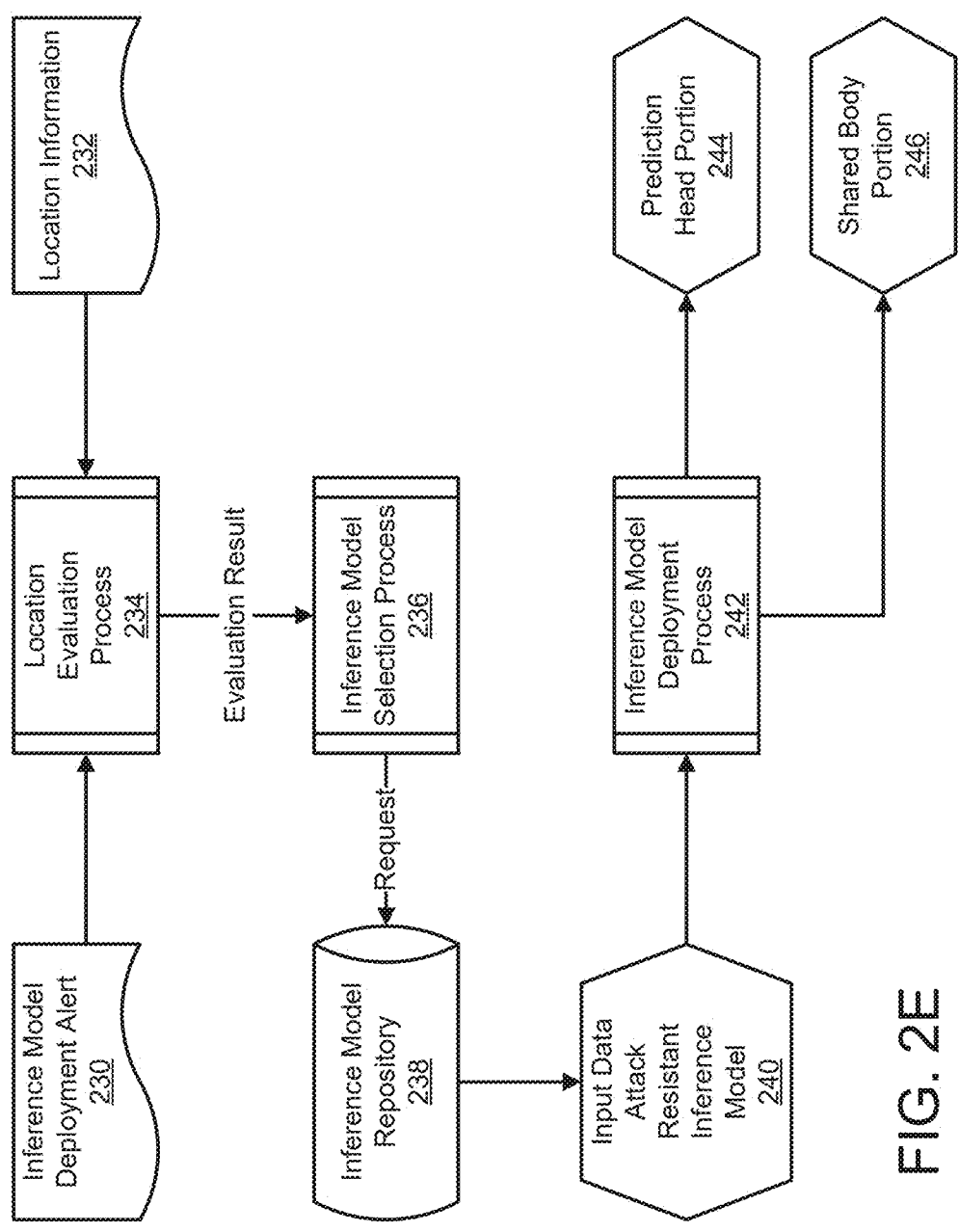
FIG. 2E shows a block diagram illustrating management of an input data attack resistant inference model in accordance with an embodiment.

To further clarify embodiments disclosed herein, data flow diagrams in accordance with an embodiment are shown in FIGS. 2D-2E. In these diagrams, flows of data and processing of data are illustrated using different sets of shapes. A first set of shapes (e.g., 220, 224, etc.) is used to represent data structures, a second set of shapes (e.g., 222, 234, etc.) is used to represent processes performed using and/or that generate data, a third set of shapes (e.g., 238, etc.) is used to represent large scale data structures such as databases, and a fourth set of shapes (e.g., 240, 244, etc.) is used to represent trained inference models and/or portions of trained inference models.

Turning to FIG. 2D, a data flow diagram in accordance with an embodiment is shown. The data flow diagram may illustrate data used in and data processing performed in generation of a set of reconstruction score thresholds.

Consider a scenario in which an input data attack resistant inference model is trained to impart reconstruction resistance to portions of sensitive information (e.g., input features, portions of derived data based on at least one of the input features). However, the input data attack resistant inference model may be selectively untrained to impart higher levels of reconstruction resistance to some portions of the sensitive information and lower levels of reconstruction resistance to other portions of the sensitive information.

Performing untraining processes may be computationally costly processes and, therefore, by weighting the portions of the sensitive information for reconstruction resistance, computational resources may be conserved during the untraining processes.

To determine how to weight the portions of the sensitive information for reconstruction resistance, a set of reconstruction score thresholds may be obtained using a schema (e.g., schema 220) for weighting, at least, the input features for reconstruction resistance. Schema 220 may indicate any number of reconstruction score thresholds for portions of sensitive information (e.g., for input features, for portions of derived data based on input features), may include a rule set for generation of reconstruction score thresholds, and/or may otherwise indicate a system for weighting, at least, input features for reconstruction resistance during inference generation by an inference model.

For example, the schema may indicate that reconstruction score thresholds for the portions of the sensitive information may be based on levels of sensitivity for the portions of the sensitive information. A reconstruction score threshold may indicate an acceptable degree of reconstructability for, for example, an input feature and the reconstruction score threshold may decrease as a level of sensitivity for the input feature increases. In addition, the level of sensitivity of the input feature may be based on a level of impact of undesired access to the input feature (e.g., a level of risk associated with potential compromise of the input feature by a malicious entity).

To obtain reconstruction score thresholds for the portions of the sensitive information, reconstruction score threshold generation process 222 may be performed using test data set 224 and schema 220. Test data set 224 may include instances of the portions of the sensitive information. The instances may include, for example, types of input features, types of portions of derived data, etc. For example, test data set 224 may include temperature as an instance of an input feature if temperature measurements are expected to be used as ingest for an inference model. Test data set 224 may also include a widget production rate in a manufacturing environment as a portion of derived data based on at least one input feature. The portions of the derived data may not be used as input to an inference model and may not be obtained as output from an inference model. The portions of the derived data, however, may be inferable using at least one of the input features.

Therefore, members of test data set 224 may be based on input features that are predicted to be used as ingest for an inference model (e.g., an input data attack resistant inference model), previously collected data from data sources that are to be used as data sources for the inference model, derived values identified as relevant to the input features by any entity, etc.

During reconstruction score threshold generation process 222, the test data set may be used to perform a sensitivity analysis process to obtain levels of sensitivity for members of the test data set (e.g., the instances of the input features, the instances of the portions of the derived data) based on a rule set included in schema 220. The levels of sensitivity may be provided by a user (e.g., a business decision maker, a subject matter expert, another individual responsible for ranking and/or managing levels of sensitivity) and/or may be based on characteristics of the portions of the sensitive information.

In a first example, test data set 224 may include types of sensor data (e.g., instances of input features) collected from any number of data collectors over time (e.g., continuously, at regular intervals) and levels of sensitivity may be assigned to the instances of the input features based on information content of the input features. Information content of an input feature may be based on at least one of variability of the input feature and public accessibility of information regarding the input feature. In addition, a level of sensitivity for the input feature may increase as the information content of the input feature increases. The information content of the input features may be based on other factors without departing from embodiments disclosed herein.

The variability of an input feature may indicate an extent to which the input feature fluctuates over time. For example, a first temperature sensor may be positioned to collect temperature measurements inside a freezer and the temperature measurements collected by the first temperature sensor may fluctuate within a narrow range (e.g., five degrees Celsius). However, a second temperature sensor may be positioned in an ambient environment to collect temperature measurements throughout the day and night. Temperature measurements collected by the second temperature sensor may fluctuate within a wider range (e.g., of twenty degrees Celsius). Therefore, the temperature measurements collected by the second temperature sensor may be considered as having a higher degree of variability (and, therefore, a higher information content) than the temperature measurements collected by the first temperature sensor.

The public availability of the information regarding the input feature may be obtained by searching publicly accessible data sources, internally available data sources, and/or other data sources to identify an extent to which the input feature may be obtained without reconstructing the input feature using at least an inference. For example, measurements associated with a first input feature may be posted publicly on a social media website and/or a business's website. However, measurements associated with a second input feature may be available on a password protected page of a business's website for access by authorized employees of the business only. Consequently, the first input feature may be considered to have a higher degree of public availability than the second input feature. A higher degree of public availability may be associated with a lower information content and, therefore, a lower level of sensitivity for the input feature.

In a second example, portions of derived data may be ranked (e.g., by an individual, by an algorithm trained to rank sensitivity of portions of derived data) based on relative levels of impact of unauthorized access to the portions of the derived data. The ranked portions of the derived data may be used to assign levels of sensitivity to the portions of the derived data (e.g., with a higher level of impact corresponding to a higher level of sensitivity).

For example, portions of the derived data may include any number of aggregated and/or calculated values based on measurements collected within a manufacturing environment. A first portion of the derived data may include an average temperature measurement based on a series of temperature measurements collected over the course of a week. A second portion of the derived data may include a failure rate of widgets produced in the manufacturing environment over the course of the week. A user (e.g., a subject matter expert, a business decision maker) may identify the second portion of the derived data as more sensitive (e.g., may be more negatively impactful if compromised by a malicious entity) than the first portion of the derived data and may rank the two portions accordingly.

Levels of sensitivity of portions of derived data may be based on other factors including, for example, public availability of the portions of the derived data without departing from embodiments disclosed herein. In addition, the levels of sensitivity may be obtained for the portions of the sensitive information using any other criteria and/or based on other characteristics of the portions of the sensitive information without departing from embodiments disclosed herein.

The levels of sensitivity may then be used to obtain reconstruction score thresholds 226. Reconstruction score thresholds 226 may include any number of reconstruction score thresholds corresponding to any number of instances of portions of the sensitive information. Sensitive information may include any information that may be restricted for access and may include input features, portions of derived data, etc. A reconstruction score threshold may indicate an acceptable degree of reconstructability for an input feature and/or a portion of derived data and the reconstruction score threshold may decrease as the level of sensitivity for an input feature and/or a portion of derived data increases. The reconstruction score thresholds may be assigned based on any rubric for assigning reconstruction score thresholds based on relative levels of sensitivity.

For example, levels of sensitivity may be represented as numbers between 1 and 10 with 1 representing a lowest level of sensitivity and 10 representing a highest level of sensitivity. The numbers included in this scale may be associated with degrees of reconstructability, which may be used to assign reconstruction score thresholds.

Specifically, a level of sensitivity of 1 may correspond to an acceptable degree of reconstructability of up to 90% and, therefore, a reconstruction score threshold corresponding to an input feature with a level of sensitivity of 1 may include a maximum reconstructability of 90%. Similarly, a level of sensitivity of 10 may correspond to an acceptable degree of reconstructability of up to 5% and, therefore, a reconstruction score threshold corresponding to an input feature with a level of sensitivity of 10 may include a maximum reconstructability of 5%.

Turning to FIG. 2E, a data flow diagram in accordance with an embodiment is shown. The data flow diagram may illustrate data used in and data processing performed in managing deployment of inference models.

As part of managing deployment of inference models, inference model deployment alert 230 may be obtained. Inference model deployment alert 230 may include any type and quantity of information indicating that an inference model is to be deployed to a location. The location may include any number of data processing systems located at a particular geographical location. For example, inference model deployment alert 230 may include: (i) a list of specifications for the inference model that is to be deployed (e.g., a type of inference desired, a computational cost for operating the inference model), (ii) an identifier for the location to which the inference model is to be deployed, (iii) a schedule for deployment of the inference model, and/or (iv) other information.

To determine whether to deploy the inference model to the location, location evaluation process 234 may be performed.

During location evaluation process 234, any amount of information from inference model deployment alert 230 may be utilized along with at least location information 232 to determine whether the location is trustworthy.

For example, during location evaluation process 234, the identifier for the location may be extracted from inference model deployment alert 230 and used to obtain location information 232 (e.g., via requesting the information, performing a lookup process). Location information 232 may include any type and quantity of information related to the location. The information related to the location may include: (i) data privacy restrictions that the location is subject to, (ii) historical interactions with the location, (iii) information related to network security and/or data storage security for the location, (iv) a list of entities with access to the location, and/or (v) other information.

During location evaluation process 234, it may be determined whether the information included in location information 232 meets trustworthiness criteria (not shown). The trustworthiness criteria may indicate that the location may be considered trustworthy if the location is subject to the same data privacy regulations (e.g., general data protection regulation (GDPR)), the location adheres to certain data security and/or network security protocols, etc.

An evaluation result may be generated as a result of location evaluation process 234. The evaluation result may indicate whether or not the location is to be considered trustworthy. In FIG. 2E, the evaluation result may indicate that the location is not trustworthy.

To respond to the evaluation result, inference model selection process 236 may be performed. During inference model selection process 236, a request may be provided to inference model repository 238 to select an input data attack resistant inference model. The request may also include any number of inference model characteristics that may be generated during inference model selection process 236 and/or may be obtained from inference model deployment alert 230. The inference model characteristics may include a type and/or quantity of inferences to be generated by the inference model, a computational cost to hosting and/or operating the inference model, etc.

Inference model repository 238 may include any number of inference models. The inference models included in inference model repository 238 may include: (i) input data attack resistant inference models, (ii) inference models that are not input data attack resistant inference models, and/or (iii) any other type of inference models. To differentiate between the inference models, identifiers for the inference models may be organized so that identifying characteristics of the inference models may be able to be searched for and/or used to perform a lookup process.

For example, during inference model selection process 236, a search process may be performed using any number of search terms to indicate that an input data attack resistant inference model is to be selected. Doing so may yield a list of available input data attack resistant inference models and additional identifying information about the input data attack resistant inference models.

Input data attack resistant inference model 240 may be selected as a result of inference model selection process 236. Input data attack resistant inference model 240 may be selected based on any criteria including: (i) computational cost to operate, (ii) storage cost to host, (iii) a type of inferences generated, (iv) contents of test data sets used during training, and/or (v) other criteria.

Input data attack resistant inference model 240 may be a neural network inference model trained to prevent inferences generated by input data attack resistant inference model 240 being usable to infer input features of input data used to generate the inferences and/or portions of derived data based on at least one input feature of the input data. Refer to FIGS. 2A-2C for additional details regarding input data attack resistant inference models. Refer to FIGS. 3B-4C for additional details regarding training input data attack resistant inference models.

To deploy input data attack resistant inference model 240 and, therefore, initiate inference generation, inference model deployment process 242 may be performed. During inference model deployment process 242, prediction head portion 244 may be deployed to a first location and shared body portion 246 may be deployed to a second location. Prediction head portion 244 may be a first portion of input data attack resistant inference model 240 and shared body portion 246 may be a second portion of input data attack resistant inference model 240.

The second location (e.g., where shared body portion 246 is deployed to) may be a location that has access to input data for input data attack resistant inference model 240. The second location may be a trusted data source and/or another data processing system trusted to access the input data. The first location (e.g., where prediction head portion 244 is deployed to) may be a location (e.g., a data processing system) that does not have access to the input data. The first location may not have access to the input data due to not being trusted by the second location. The first location may not be trusted to access the input data due to: (i) differences in data privacy regulations between the first location and the second location, (ii) network security concerns, (iii) security concerns at the second location, and/or (iv) other reasons. The first location may be located remote from the second location throughout a distributed system (e.g., a distributed environment).

To perform inference generation, the input data may be ingested by shared body portion 246 at the second location and a partially processed inference model result may be generated as output from shared body portion 246.

The partially processed inference model result may be transmitted to the first location and ingested by prediction head portion 244 to complete the inference generation process. Prediction head portion 244 may include any number of output layers of a neural network that may generate inferences as an output.

Consequently, if a malicious entity gained access to the partially processed inference model result and/or the inference model results (e.g., inferences), the malicious entity may be less likely to be able to successfully reconstruct the portions of the sensitive information when compared to an inference model that is not an input data attack resistant inference model. Refer to FIGS. 3B-4C for additional details regarding training the input data attack resistant inference model.

Any of the processes illustrated using the second set of shapes may be performed, in part or whole, by digital processors (e.g., central processors, processor cores, etc.) that execute corresponding instructions (e.g., computer code/software). Execution of the instructions may cause the digital processors to initiate performance of the processes. Any portions of the processes may be performed by the digital processors and/or other devices. For example, executing the instructions may cause the digital processors to perform actions that directly contribute to performance of the processes, and/or indirectly contribute to performance of the processes by causing (e.g., initiating) other hardware components to perform actions that directly contribute to the performance of the processes.

Any of the processes illustrated using the second set of shapes may be performed, in part or whole, by special purpose hardware components such as digital signal processors, application specific integrated circuits, programmable gate arrays, graphics processing units, data processing units, and/or other types of hardware components. These special purpose hardware components may include circuitry and/or semiconductor devices adapted to perform the processes. For example, any of the special purpose hardware components may be implemented using complementary metal-oxide semiconductor based devices (e.g., computer chips).

Any of the data structures illustrated using the first and third set of shapes may be implemented using any type and number of data structures. Additionally, while described as including particular information, it will be appreciated that any of the data structures may include additional, less, and/or different information from that described above. The informational content of any of the data structures may be divided across any number of data structures, may be integrated with other types of information, and/or may be stored in any location.

Thus, using the data flow shown in FIG. 2E, an inference model may be deployed to perform inference generation while reducing a likelihood that a malicious entity may be able to reconstruct portions of sensitive information using at least the inferences.

As discussed above, the components and/or data structures of FIG. 1 may perform various methods to provide inference model management services in a manner that imparts reconstruction resistance to at least input features during inference generation. FIGS. 3A-3D illustrate methods that may be performed by the components of FIG. 1. In the diagrams discussed below and shown in these figures, any of the operations may be repeated, performed in different orders, omitted, and/or performed in parallel and/or a partially overlapping in time manner with other operations.

Figure 3A:
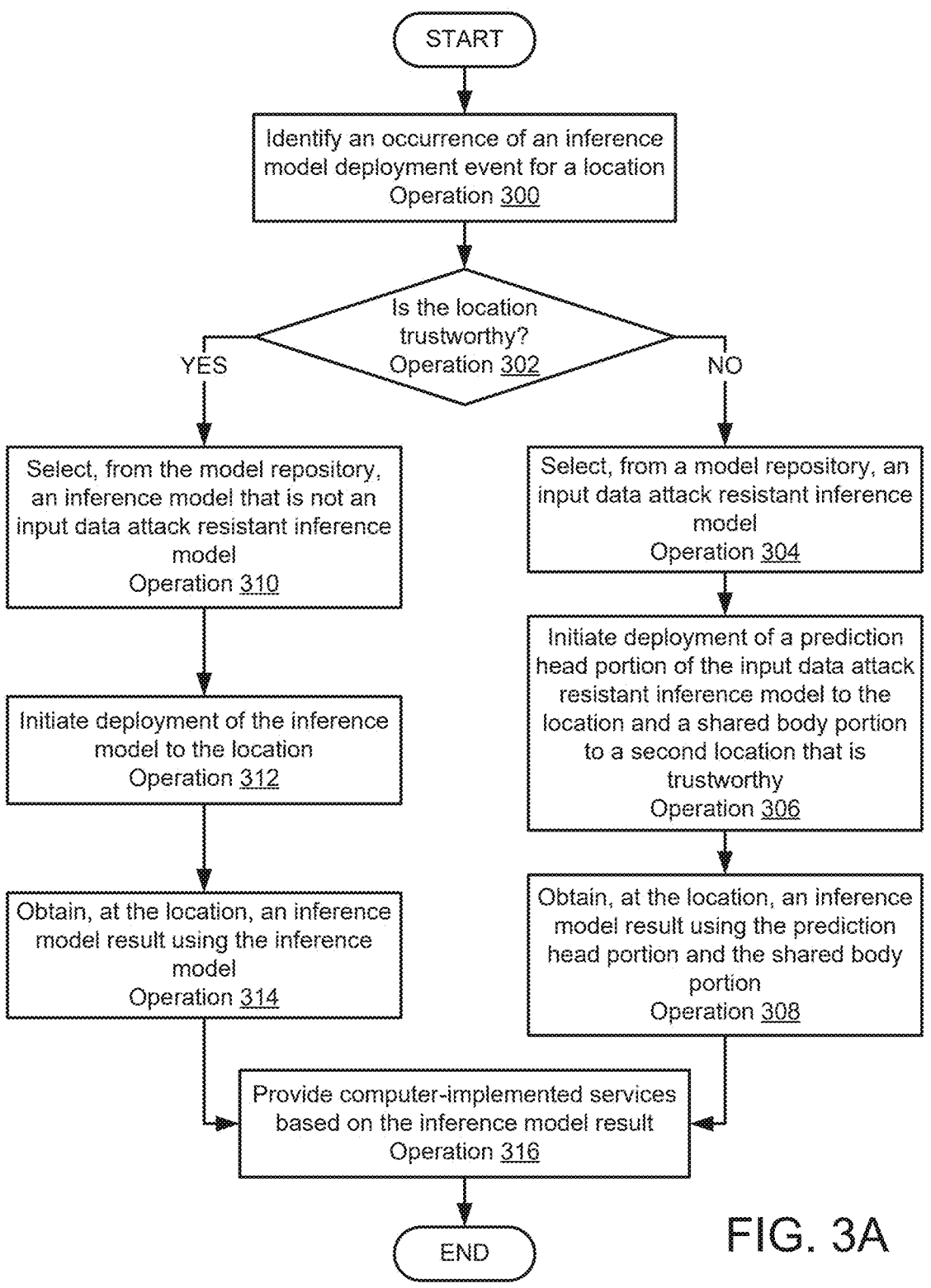

Turning to FIG. 3A, a first flow diagram illustrating a method of managing use of inference models in accordance with an embodiment is shown. The method may be performed, for example, by a data processing system, a client device, an inference model manager, cooperatively by multiple devices throughout a distributed system, and/or other components and/or data structures illustrated in FIGS. 1-2E.

At operation 300, an occurrence of an inference model deployment event may be identified for a location. Identifying the occurrence of the inference model deployment event may include: (i) receiving a notification (e.g., via a message over a communication system, via user input to a graphical user interface) that the inference model deployment event has occurred, (ii) reading a notice of the occurrence of the inference model deployment event from storage (e.g., from inference model deployment schedule), and/or (iii) other methods. Identifying the occurrence of the inference model deployment event may also include obtaining an identifier for the location (e.g., from the notification, from storage, from the location).

At operation 302, it may be determined whether the location is trustworthy. Determining whether the location is trustworthy may include: (i) identifying any data privacy regulations (e.g., GDPR) that the location is subject to, (ii) obtaining telemetry data for the location indicating a security posture for the location, (iii) obtaining a level of trust for a communication channel utilized by the location, and/or (iv) other methods.

Determining whether the location is trustworthy may also include comparing the information obtained about the location (e.g., security posture, data privacy regulations) to trustworthiness criteria. The trustworthiness criteria may indicate security requirements (and/or other requirements) that must be satisfied for the location to be considered trustworthy.

For example, input data desired to be used for inference generation may be subject to GDPR and the location may be in a geographical location that is not subject to GDPR. Therefore, the trustworthiness criteria may indicate that the location must be subject to GDPR and, consequently, the location may be determined to be untrustworthy.

In a second example, the input data desired to be used for inference generation may include confidential information related to a business. Due to data privacy concerns, the location may not be considered trustworthy to receive the input data via a communication channel.

If the location is not determined to be trustworthy, the method may proceed to operation 304. At operation 304, an input data attack resistant inference model may be selected from a model repository. Selecting the input data attack resistant inference model may include: (i) identifying a set of features of the input data attack resistant inference model (e.g., based on a desired type and/or quantity of inference, based on a computational resource requirement to operate the inference model, characteristics of data sets used during training of the input data attack resistant inference model), (ii) utilizing the set of features of the input data attack resistant inference model to search the model repository (e.g., using search terms, using a lookup process) to identify the input data attack resistant inference model, and/or (iii) other methods.

Selecting the input data attack resistant inference model may also include providing the set of features to another entity responsible for identifying the input data attack resistant inference model and receiving the input data attack resistant inference model (and/or an identifier for the input data attack resistant inference model) from the entity.

At operation 306, deployment of a prediction head portion of the input data attack resistant inference model to the location and a shared body portion to a second location that is trustworthy may be initiated. To do so, the input data attack resistant inference model may be split into the shared body portion and the prediction head portion. Splitting the input data attack resistant inference model may include separating layers of a neural network into two portions. The first portion (e.g., the shared body portion) may include any number of input layers of the neural network and any number of hidden layers of the neural network. Similarly, the second portion (e.g., the prediction head portion) may include any number of hidden layers of the neural network and any number of output layers of the neural network.

Initiating deployment of the prediction head portion to the location may include: (i) transmitting the prediction head portion to the location, (ii) storing the prediction head portion in storage shared with the location for subsequent retrieval by the location, and/or (iii) other methods. Initiating deployment of the prediction head portion to the location may also include providing instructions to another entity responsible for managing deployment of the prediction head portion to the location.

Initiating deployment of the shared body portion to a location that is trustworthy may include: (i) identifying the location that is trustworthy (e.g., based on similar criteria used to determine if the location was trustworthy in operation 302), and/or (ii) providing the shared body portion to the location that is trustworthy. Providing the shared body portion to the location that is trustworthy may include: (i) transmitting the shared body portion to the location that is trustworthy, (ii) storing the shared body portion in storage shared with the location that is trustworthy for subsequent retrieval by the location that is trustworthy, and/or (iii) other methods.

Initiating deployment of the shared body portion to the location that is trustworthy may also include providing instructions to another entity responsible for managing deployment of the shared body portion to the location that is trustworthy.

At operation 308, an inference model result (e.g., inference) may be obtained using the prediction head portion and the shared body portion at the location. Obtaining the inference model result may include: (i) feeding input data for the input data attack resistant inference model into an input layer of the shared body portion, (ii) obtaining, as output from the shared body portion, a partially processed inference model result, (iii) obtaining, at the location, the partially processed inference model result, (iv) feeding the partially processed inference model result into the prediction head portion to obtain the inference model result as output from the prediction head portion, and/or (v) other methods.

Obtaining the inference model result at the location may also include: (i) providing first instructions to the second location, the first instructions indicating that the input data is to be fed into the input layer and the partially processed inference model result is to be provided to the location, (ii) providing second instructions to the location, the second instructions indicating that the partially processed inference model result is to be ingested by the prediction head portion to obtain the inference model result.

At operation 316, computer-implemented services may be provided based on the inference model result. Providing the computer-implemented services may include: (i) making a decision based at least in part on the inference model result, (ii) identifying a type and/or quantity of service to provide to a particular user based at least in part on the inference model result, (iii) providing the inferences to another entity, and/or (iv) other methods. The method may end following operation 316.

Returning to operation 302, the method may proceed to operation 310 if the location is determined to be trustworthy. At operation 310, an inference model that is not an input data attack resistant inference model may be selected from the model repository. The inference model that is not the input data attack resistant inference model may be selected to reduce a computational cost for hosting and/or operating the inference model.

For example, an input data attack resistant inference model may be more computationally costly to train, host, and operate than the inference model that is not an input data attack resistant inference model. Therefore, the inference model that is not the input data attack resistant inference model may be selected if the location is trustworthy and, consequently, a more computationally costly inference model is not requested to proceed with inference generation at the location.

Selecting the inference model that is not the input data attack resistant inference model may include methods similar to those described with respect to operation 304.

At operation 312, deployment of the inference model to the location may be initiated. Initiating deployment of the inference model to the location may include methods similar to those described with respect to operation 306. However, at operation 312, the inference model may be deployed in its entirety without splitting the inference model into a shared body portion and a prediction head portion.

At operation 314, an inference model result may be obtained at the location using the inference model. To obtain the inference model result at the location using the inference model, input data for the inference model may be obtained and fed into an input layer of the inference model. The inference model result may be obtained as an output from an output layer of the inference model.

Following operation 314, the method may proceed to operation 316.

The method may end following operation 316.

Therefore, the method described in FIG. 3A may be used to deploy inference models to locations where inferences are desired to be generated. Input data attack resistant inference models may be deployed if data privacy concerns and/or data security concerns are identified for the location. By doing so, a likelihood that a malicious entity may reconstruct sensitive information using inferences generated by the inference model may be reduced.

Turning to FIG. 3B, a second flow diagram illustrating a method of managing use of inference models in accordance with an embodiment is shown. In FIG. 3B, the method of managing use of the inference models may include a training process for an input data attack resistant inference model. The input data attack resistant inference model may be based, at least in part, on a training process that includes a weight freezing process based on levels of reconstructability of input features based on inferences generated by the input data attack resistant inference model.

The method may be performed, for example, by a data processing system, a client device, an inference model manager, cooperatively by multiple devices throughout a distributed system, and/or other components and/or data structures illustrated in FIGS. 1-2E.

At operation 320, a multipath inference model may be obtained. The multipath inference model may include: (i) a first inference generation path that includes a prediction head portion and a shared body portion and (ii) a second inference generation path that includes a reconstruction head portion and the shared body portion.

Obtaining the multipath inference model may include: (ii) obtaining an inference model trained using a first training data set, (ii) dividing the inference model to obtain a shared body portion and a first head portion (e.g., the prediction head portion), (iii) freezing weights of the shared body portion, (iv) obtaining a second head portion (e.g., the reconstruction head portion), (iv) training the reconstruction head portion using a second training data set while the weights of the shared body portion are frozen, and/or (vi) other methods.

Obtaining the inference model may include: (i) reading the inference model from an inference model repository, (ii) receiving the inference model from another entity, (iii) generating the inference model by training the inference model using the first training data set, and/or (iv) other methods.

Dividing the inference model may include separating layers of a neural network of the inference model so that output layers of the inference model and any number of layers of neurons from the hidden layer may be assigned to the shared body portion and any remaining layers of neurons of the hidden layer may be assigned to the prediction head portion along with the output layers of the neural network.

Freezing the weights of the shared body portion may include placing the weights of the shared body portion in an immutable state. By doing so, the weights may not change during any training processes performed while the weights are frozen.

Obtaining the reconstruction head portion may include: (i) duplicating the prediction head portion, (ii) generating a data structure that may include different numbers of neurons in layers and/or different numbers of layers than that of the prediction head portion, and/or (iii) other processes.

Training the reconstruction head portion may include: (i) obtaining the second training data set, (ii) performing a training process using the frozen shared body portion, the reconstruction head portion, and the second training data set to obtain a trained reconstruction head portion, and/or (iii) other methods. In a first example, the second training data set may include a set of input features and labels. The labels may include the input features and, therefore, the reconstruction head portion may be trained to reconstruct input features ingested by the shared body portion. In a second example, the second training data set may include a set of input features and labels that include portions of derived data based on at least one of the input features. Therefore, in the second example, the reconstruction head portion may be trained to predict the portions of the derived data.

Therefore, the multipath inference model may include the first inference generation path (e.g., including the shared body portion and the prediction head portion) and the second inference generation path (e.g., including the shared body portion and the reconstruction head portion).

At operation 322, a set of reconstruction score thresholds may be obtained using a schema for weighting, at least, input features for reconstruction resistance. The schema may indicate reconstruction score thresholds for the input features and/or portions of derived data based on at least one of the input features. Obtaining the set of the reconstruction thresholds may include: (i) obtaining a test data set including instances of the input features, (ii) performing, using the test data set, an input feature sensitivity analysis process to obtain levels of sensitivity for, at least, the input features, (iii) assigning reconstruction score thresholds to, at least, each input feature of the input features based on the levels of sensitivity, and/or (iv) other methods. Refer to FIG. 3C for additional information regarding obtaining the set of the reconstruction score thresholds.

At operation 324, an untraining process may be performed for the second inference generation path to reduce a reconstruction score for the second inference generation path and to update the shared body portion. The untraining process may reduce the second inference generation path's ability to reconstruct input features and may include any number of untraining and training cycles. As a result of the untraining process, an updated shared body portion may be obtained. Refer to FIG. 3D for additional details regarding the untraining process.

At operation 326, a first training process may be performed for the first inference generation path while the updated shared body portion is frozen to obtain an updated prediction head portion. Performing the first training process may include: (i) training the prediction head portion using the first training data set to increase the prediction head portion's ability to predict labels from the first training data set, (ii) testing the first inference generation path's ability to predict the labels, and/or (iii) other methods.

Testing the first inference generation path's ability to predict the labels may include obtaining a confidence level for the training process, the confidence level indicating an extent to which the first inference generation path successfully predicts the labels. If the confidence level meets a confidence level threshold, the first inference generation path may be accepted for use in inference generation. If the confidence level does not meet the confidence level threshold, the first inference generation path may be re-trained.

Re-training the first inference generation path may include repeating any portion of the processes described in operations 320-328 any number of times. For example, re-training the first inference generation path may include: (i) un-freezing the weights of the shared body portion, (ii) re-training the shared body portion and the prediction head portion to predict the labels of the first training data set, (iii) freezing the weights of the shared body portion, (iv) training the reconstruction head portion while the weights of the shared body portion are frozen, (v) un-freezing the weights of the shared body portion, (vi) un-training the shared body portion and the reconstruction head portion, (v) freezing the weights of the shared body portion, (vi) training the prediction head portion while the weights of the shared body portion are frozen, (vii) re-testing the confidence level of the first inference generation path, and/or (viii) other methods.

The first inference generation path and the second inference generation path may be iteratively trained (and un-trained) until reconstruction scores for the input features falls below corresponding reconstruction score thresholds and the confidence level meets the confidence level threshold.

At operation 328, the updated prediction head portion and the updated shared body portion may be used as the input data attack resistant inference model. The input data attack resistant inference model may, therefore, include an updated first inference generation path. The updated first inference generation path may have a decreased likelihood of being usable by a malicious entity to successfully reconstruct sensitive information when compared to the first inference generation path prior to the updating.

Using the updated prediction head portion and the updated shared body portion as the input data attack resistant inference model may include: (i) encapsulating the updated prediction head portion and the updated shared body portion in a data structure (e.g., the structure of the neural network, weights of the neural network), (ii) storing the data structure in the model repository for use in inference model deployment events, (iii) providing the data structure to another entity for use in inference generation, and/or (iv) other methods.

The method may end following operation 328.

Turning to FIG. 3C, a flow diagram illustrating a method of obtaining a set of reconstruction score thresholds in accordance with an embodiment is shown. The method may be performed, for example, by a data processing system, a client device, a communication system, an inference model manager, cooperatively by any number of devices throughout a distributed system, and/or by any other device. The operations described in FIG. 3C may be an expansion of operation 322 in FIG. 3B.

At operation 330, a test data set including instances of the input features may be obtained. Obtaining the test data set may include: (i) reading the test data set from storage, (ii) receiving the test data set from another entity (e.g., as a message over a communication system), (iii) generating the test data set, and/or (iv) other methods.

For example, the test data set may include a set of instances of input features for an inference model. The instances of the input features may include, for example, types of input features representative of types of input features that may be obtained (e.g., may be collected continuously from a data collector) and used as ingest for the inference model. Specifically, an instance of an input feature may include temperature, pressure, and/or other types of input features if an inference model is expected to ingest temperature and/or pressure measurements.

Generating the test data set may include: (i) obtaining a representative data set from one or more data sources that are expected to provide ingest data to the inference model, (ii) predicting types of input features that are to be used by the inference model and generating the test data set based on the predictions, and/or (iii) other methods.

Obtaining the test data set may also include obtaining a set of instances of derived values that are derivable using at least one of the input features. The instances of the set of the derived values may be provided by a user, may be predicted based on portions of the input features, and/or may be obtained via other methods.

At operation 332, an input feature sensitivity analysis process may be performed using the test data set to obtain levels of sensitivity for, at least, the input features. Performing the input feature sensitivity analysis process may include: (i) performing a variability analysis using at least the instances of the input features from the test data set to obtain degrees of variability for the input features, (ii) performing a public availability analysis for the instances of the input features and/or the instances of the derived values from the test data set to obtain degrees of public availability for the input features and/or the derived values, (iii) obtaining user input regarding relative impact of compromise (e.g., unauthorized access by a malicious entity) of the instances of the input features and/or the instances of the derived values, (iv) assigning the levels of sensitivity based on the degrees of variability, the degrees of public availability, the user input, and/or other factors, and/or (iv) other methods.

Performing the variability analysis may include: (i) obtaining measurements (e.g., historic measurements, synthetic measurements, recently generated measurements) for each instance of the input features (e.g., historic temperature measurements collected by a temperature sensor), (ii) determining a degree of variability of the measurements (e.g., based on a range over which the historic temperature measurements fluctuate) for each instance of the input features, and/or (iii) other methods.

Performing the public availability analysis may include: (i) searching publicly available sources (e.g., social media, open-source data sources) for the instances of the input features and/or the derived values, (ii) determining a degree of public availability for each of the instances of the input features and/or the instances of the derived values based on a result of the searching, and/or (iii) other methods.

For example, a first instance (e.g., type) of an input feature may include temperature measurements of an outdoor environment and a second instance of an input feature may include measurements collected by an instrument during a chemical synthesis process in an industrial environment. The temperature measurements may be assigned a higher degree of public availability than the instrument measurements, as weather data for the outdoor environment may be available from other data sources and the instrument measurements may be only available to an operator of the instrument.

Assigning the levels of sensitivity may include aggregating information (e.g., user input, degrees of variability, degrees of public availability) and mapping the aggregated information to a relative level of sensitivity for each of the input features and/or derived values based on any rubric and/or criteria for assigning levels of sensitivity. For example, a lower degree of variability may reduce a level of sensitivity of an input feature and a higher degree of public availability may reduce a level of sensitivity of the input feature.

At operation 334, reconstruction score thresholds may be assigned to, at least, each input feature of the input features based on the levels of sensitivity. Assigning the reconstruction score thresholds may include: (i) generating the reconstruction score thresholds, (ii) providing the levels of sensitivity to another entity responsible for generating the reconstruction score thresholds, (iii) reading the reconstruction score thresholds from storage, and/or (iv) other methods.

Generating the reconstruction score threshold may include comparing the levels of sensitivity to any criteria and/or rubric for assigning reconstruction score thresholds. For example, the levels of sensitivity may be represented as numbers between 1 and 10 with 1 representing the lowest level of sensitivity and 10 representing the highest level of sensitivity. Each number of the scale of 1 to 10 may be associated (e.g., via a rubric provided by a client, subject matter expert, and/or other individual in charge of managing reconstruction score thresholds) with a maximum acceptable degree of reconstructability for the input feature and/or derived value. Specifically, a level of sensitivity of 1 may be associated with a reconstruction score indicating a maximum acceptable degree of reconstructability of 90%. Levels of sensitivity and reconstruction score thresholds may be obtained via other methods and using other criteria without departing from embodiments disclosed herein.

The method may end following operation 334.

Turning to FIG. 3D, a flow diagram illustrating a method of performing an untraining process for an inference model in accordance with an embodiment is shown. The method may be performed, for example, by a data processing system, a client device, a communication system, and/or other components illustrated in FIG. 1. The method may also be performed, for example, on the multipath inference model discussed with regard to FIG. 3A-3B. The operations described in FIG. 3D may be an expansion of operation 324 in FIG. 3B.

At operation 340, the shared weights of the shared body portion may be unfrozen. The shared weights may be unfrozen by placing the shared weights in a mutable state. This mutable state may allow the shared weights to change values during training.

At operation 342, the shared body portion and the reconstruction head portion (collectively the second inference generation path) may be un-trained to reduce the confidence of the second head portion when reconstructing input features and/or portions of derived data. This un-training may be referred to as a third training process.

To perform the untraining, the second inference generation path may be un-trained by utilizing, for example, a gradient ascent process (in contrast to a gradient descent process for optimizing inferences made by inference models) to increase the inaccuracy and/or reduce the ability of the second inference generation path to reconstruct input features and/or portions of derived data.

During operation 342, the weights of both the shared body portion and reconstruction head portion may be modified thereby reducing the shared body portion's contribution to reconstructability of portions of sensitive information. An updated shared body portion may be obtained as a result of the untraining process.

At operation 344, the weights of the updated shared body portion may be frozen. The weights of the updated shared body portion may be frozen by placing the weights of the updated shared body portion in an immutable state. This immutable state may prevent the weights of the updated shared body portion from changing values during training. In contrast, while unfrozen, the weights of the updated shared body portion may be modified through training.

At operation 346, the second head portion may be trained to reconstruct input features and/or portions of derived data using the frozen shared weights of the updated shared body portion. This training process may be referred to as a fourth training process and may result in obtaining an updated reconstruction head portion. The fourth training process may increase the ability of the second inference generation path to infer at least the input features.

By doing so, the second inference generation path may be recalibrated to reconstruct at least input features using the updated shared body portion. The weights of the second updated body portion may be frozen while the weights of the reconstruction head portion may be unfrozen.

At operation 348, a second determination may be made regarding whether a level of reconstructability of an input feature exceeds a reconstructability threshold. Making the second determination may include: (i) generating an output using the second inference generation path and the input feature, (ii) comparing the input feature to the output to generate a reconstruction score (e.g., from the set of the reconstruction score thresholds described in FIG. 3C) for the input feature, the reconstruction score indicating an extent to which the output successfully reconstructs the input data (or an extent to which the output successfully predicts a portion of derived data), (iii) comparing the reconstruction score to a reconstruction score threshold that corresponds to the input feature, and/or (iv) other methods. While described with respect to a single input feature, it may be appreciated that this process may be performed for any number of input features and/or portions of derived data without departing from embodiments disclosed herein.

The reconstruction score may include any score (e.g., a percentage, a numerical score, a textual representation) to indicate a degree to which the output infers the input feature and/or a portion of derived data. As the reconstruction score increases, an extent to which the output matches the input feature (or predicts a portion of derived data) may increase. For example, reconstruction scores may be represented as percentages. The second inference generation path (e.g., before being updated) may have a reconstruction score of 50% with respect to an input feature and the updated second inference generation path may have a reconstruction score of 35% with respect to the input feature.

If the reconstruction score falls below the reconstruction score threshold corresponding to the input feature and/or portion of derived data, it may be concluded that the second shared body portion is to be used to update the first inference generation path and the method may end following operation 348. The reconstruction score threshold may be determined by any entity (e.g., a user of a client device, a managing entity, an entity responsible for the input data).

If the reconstruction score does not fall below the reconstruction score threshold, operations 340-348 may be repeated any number of times (shown by the dashed line in FIG. 3D) to progressively reduce the second inference generation path's ability to reconstruct portions of sensitive information. However, some input features and/or portions of derived data may persistently be inferable following any number of training and untraining cycles. This may occur, for example, if an input feature has a high degree of correlation to a particular output label in a training data set.

For example, the input data attack resistant inference model may be intended to generate inferences to predict credit limits for individuals based on private information about the individuals. The predicted credit limit information (e.g., the inferences) may be used to make decisions regarding whether to extend lines of credit to individuals, etc. A training data set, therefore, may include information such as income of individuals, addresses of individuals, and age of individuals as input features and credit scores as labels. In the training data set, any of the input features (e.g., age) may be highly correlated with credit scores and, therefore, the age of individuals may have a high reconstructability after untraining.

If the level of reconstructability of the input feature remains above the reconstruction score threshold following any number of untraining cycles, the multipath inference model may be modified to disallow training based on the input feature. To do so, the method may proceed to operation 350.

At operation 350, a weight freezing process may be performed with respect to the shared body portion. The weight freezing process may be performed when a training cycle (e.g., operation 346) of the training process (e.g., operations described in FIG. 3B) tempers an impact of a previously performed untraining cycle (e.g., operations 340-348) of the training process as previously mentioned.

Performing the weight freezing process may include: (i) identifying a portion of weights of the shared body portion that operate on the inferable input feature, (ii) freezing (e.g., placing in an immutable state), the portion of the weights of the shared body portion that operate on the inferable input feature, and/or (iii) other methods. By doing so, the weights associated with the inferable input feature may not be modified during subsequent training processes while the portion of the weights are frozen. Consequently, the first inference generation path may be prevented from being trained based on the input feature during subsequent training processes.

Following operation 350, the method may proceed to operation 320 shown in FIG. 3B. By doing so, at least a portion of operations 320-328 may be performed any number of times in a loop until the reconstruction score for the input feature falls below the reconstruction score threshold for the input feature and an updated shared body portion is obtained.

An example of these processes following operation 350 may include: (i) performing a fifth training process for the first inference generation path while the portion of the weights associated with the inferable input feature are frozen to obtain a third shared body portion, (ii) freezing the third shared body portion, (iii) performing a sixth training process while the third shared body portion is frozen to obtain a second updated reconstruction head portion, (iv) performing a second untraining process using the third shared body portion and the second updated reconstruction head portion to further reduce the ability of the second inference generation path to infer the input feature and to obtain the updated shared body portion.

During the fifth training process, weights of the shared body portion that are not the portion of the weights and the prediction head portion may be updated.

Freezing the third shared body portion may include placing the weights of the third shared body portion (e.g., the weights that are not already frozen) in an immutable state.

Performing the sixth training process may include modifying weights of the reconstruction head portion using the second training data set to increase the second inference generation path's ability to reconstruct input features of the second training data set.

The second untraining process may include operations similar to those described with respect to operations 340-348 in FIG. 3D.

Using the methods illustrated in FIGS. 3A-3D, embodiments disclosed herein may facilitate management of inference models which may reduce the likelihood of the inference models generating inferences that are usable by a malicious entity to compromise sensitive information. For example, by using modified split training to manage inference models, inference models may be more reliable in providing inferences that do not lead to exposure of PII data, an individual's protected medical information, an organization's confidential data, etc.

Figure 4A:
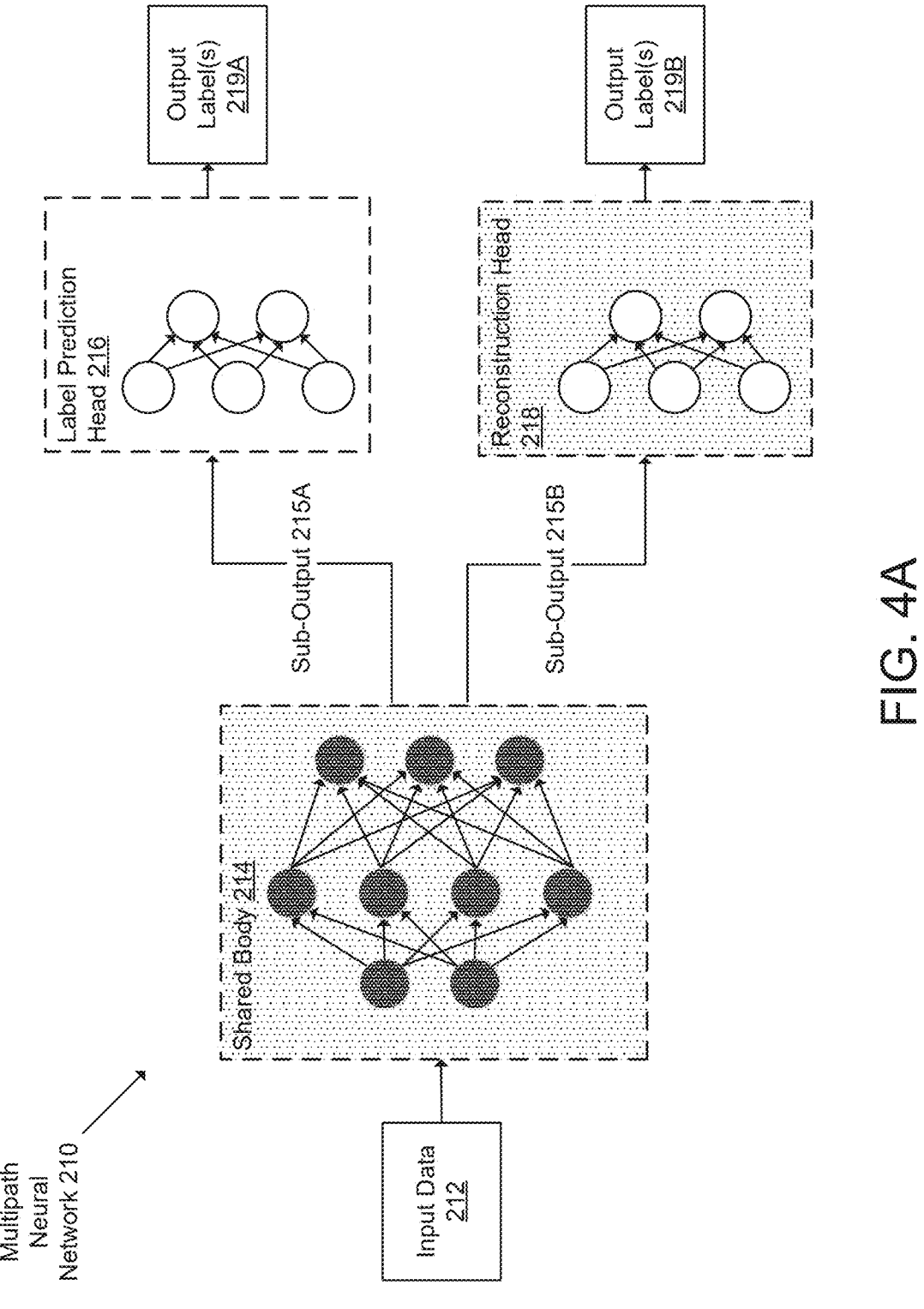
FIGS. 4A-4C show diagrams illustrating data structures and interactions during training of an input data attack resistant inference model in accordance with an embodiment.
Figure 4B:
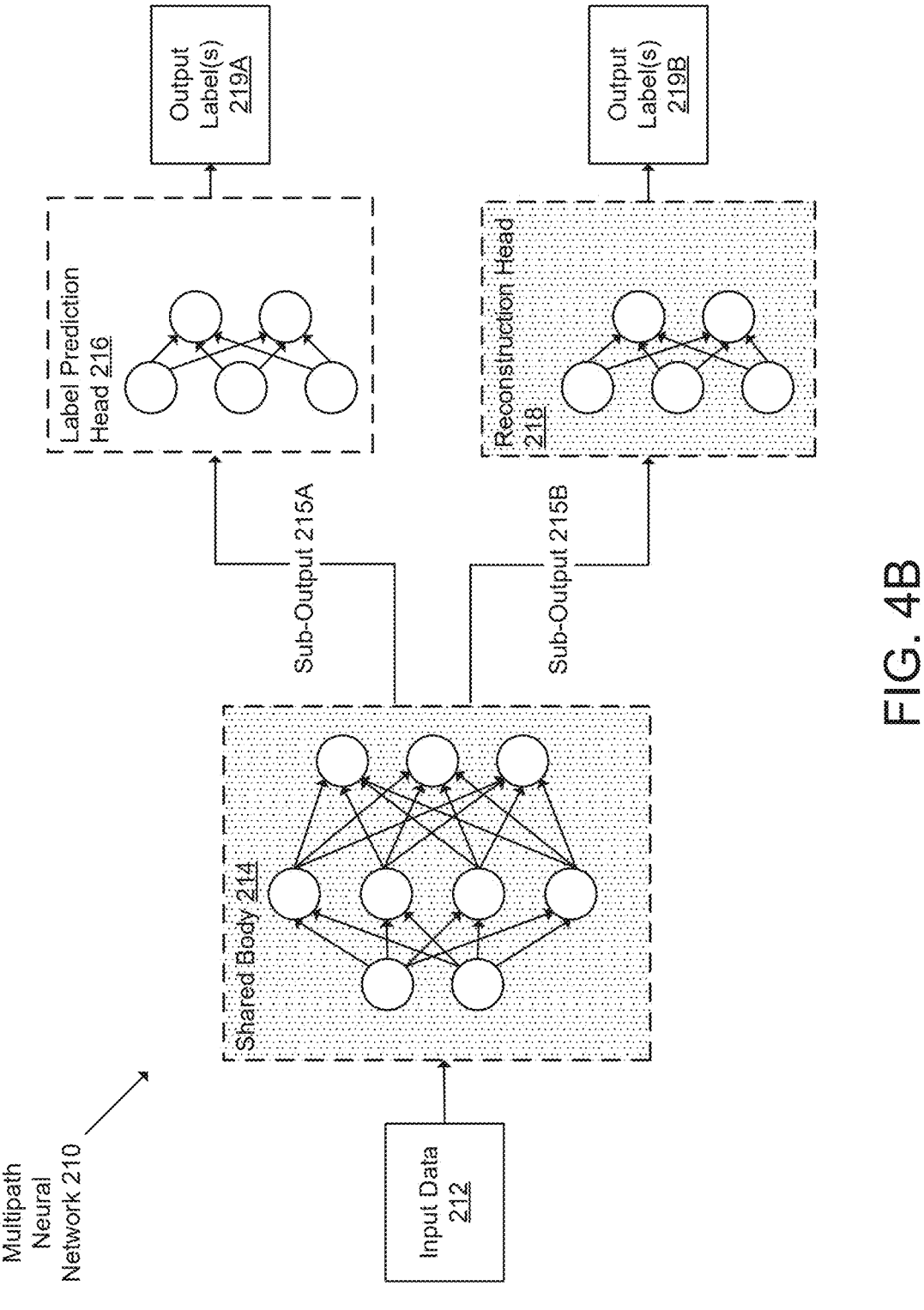
Figure 4C:
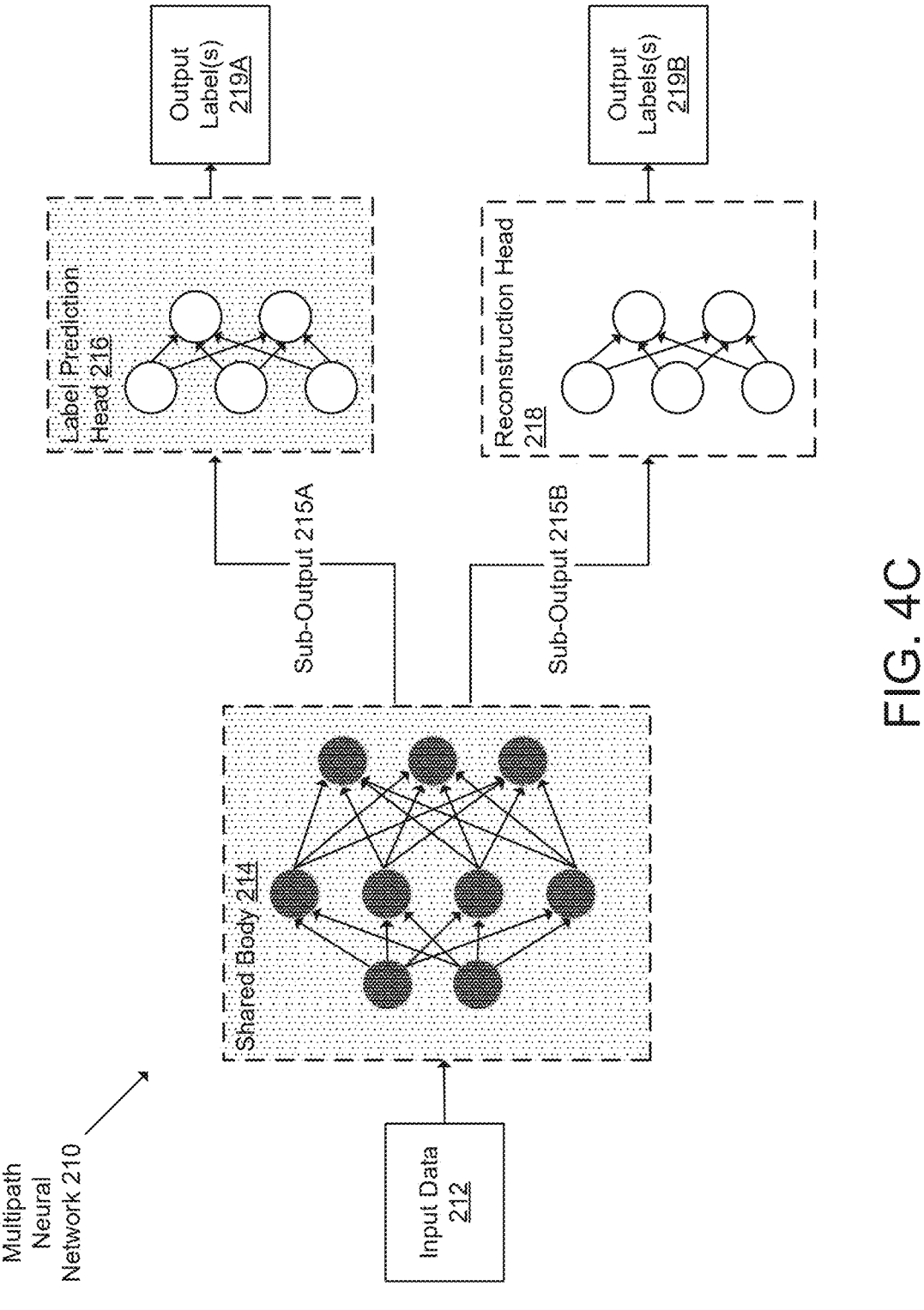

To further clarify embodiments disclosed herein, an example implementation in accordance with an embodiment is shown in FIGS. 4A-4C. These figures show diagrams illustrating data structures and interactions during training of an input data attack resistant inference model in accordance with an embodiment.

Consider a scenario in which a malicious entity gains access to any number of inferences generated by an inference model and uses the inferences to reconstruct input features used to generate the inferences and/or portions of derived data based on at least one of the input features. If the input features and/or portions of derived data include protected information (e.g., confidential data for a business), then the malicious entity may gain access to this protected information. To reduce a likelihood of sensitive information being reconstructed (e.g., inferred) by malicious entities when inferences are generated at potentially untrustworthy locations, at least a portion of an input data attack resistant inference model may be deployed to the location.

To train an input data attack resistant inference model, two inference generation paths may be obtained as shown in FIGS. 2A-2C. Once the first inference generation path and the second inference generation path have been obtained, a series of training procedures (as part of the modified split training) may be executed.

Turning to FIG. 4A, a diagram illustrating a first training procedure for the second inference generation path of multipath neural network 210 in accordance with an embodiment is shown.

During the first training procedure, the weights of shared body 214 (illustrated as a dark infill with white dots within the nodes) may be frozen. Performing the first training procedure may include utilizing a global optimization function to update a set of weights for reconstruction head 218. The portions of multipath neural network 210 trained during the first training procedure are illustrated by a dotted black infill on white background in both shared body 214 and reconstruction head 218). Completion of the first training procedure may provide a revised second inference generation path in which a reconstruction score (e.g., indicating an extent to which an input feature is successfully reconstructed) for the second inference generation path is increased.

Turning to FIG. 4B, a diagram illustrating an untraining procedure for the second inference generation path of multipath neural network 210 in accordance with an embodiment is shown. The untraining procedure may include modifying weights of the second inference generation path so that the reconstruction score for the second inference generation path is decreased. In contrast to FIG. 4A, the weights of shared body 214 that were frozen during the first training procedure may be unfrozen (e.g., graphically illustrated in FIG. 2B by the circular elements representing the nodes being filled with solid white infill) to allow for the values of the weights to change. Completion of this untraining procedure may provide an updated set of weights for shared body 214. By doing so, the untraining procedure may cause sensitive information to be less likely to be successfully reconstructed using outputs from the inference model.

Turning to FIG. 4C, a diagram illustrating a second training procedure for the first inference generation path of multipath neural network 210 in accordance with an embodiment is shown. The second training procedure may include modifying weights for the first inference generation path such that the first inference generation path is better able to predict desired features (e.g., labels for which an original inference model was trained to infer). Similar to the first training procedure, weights of the nodes of shared body 214 (illustrated as a dark infill with white dots within the nodes) may be frozen while weights of prediction head 216 may be unfrozen during second training procedure. To perform the second training procedure, the first inference generation path may be trained (illustrated by black dotted infill on white background in both shared body 214 and prediction head 216). Completion of this second training procedure may provide an input data attack resistant inference model. Inferences generated by the input data attack resistant inference model may be less likely to be usable to infer portions of sensitive information.

Thus, as illustrated in FIGS. 4A-4C, embodiments disclosed herein may facilitate protection of sensitive information while generating inferences to provide computer-implemented services. Thus, the provided computer-implemented services may be provided in a manner that is more likely to meet expectations of consumers of the services.

Figure 5:
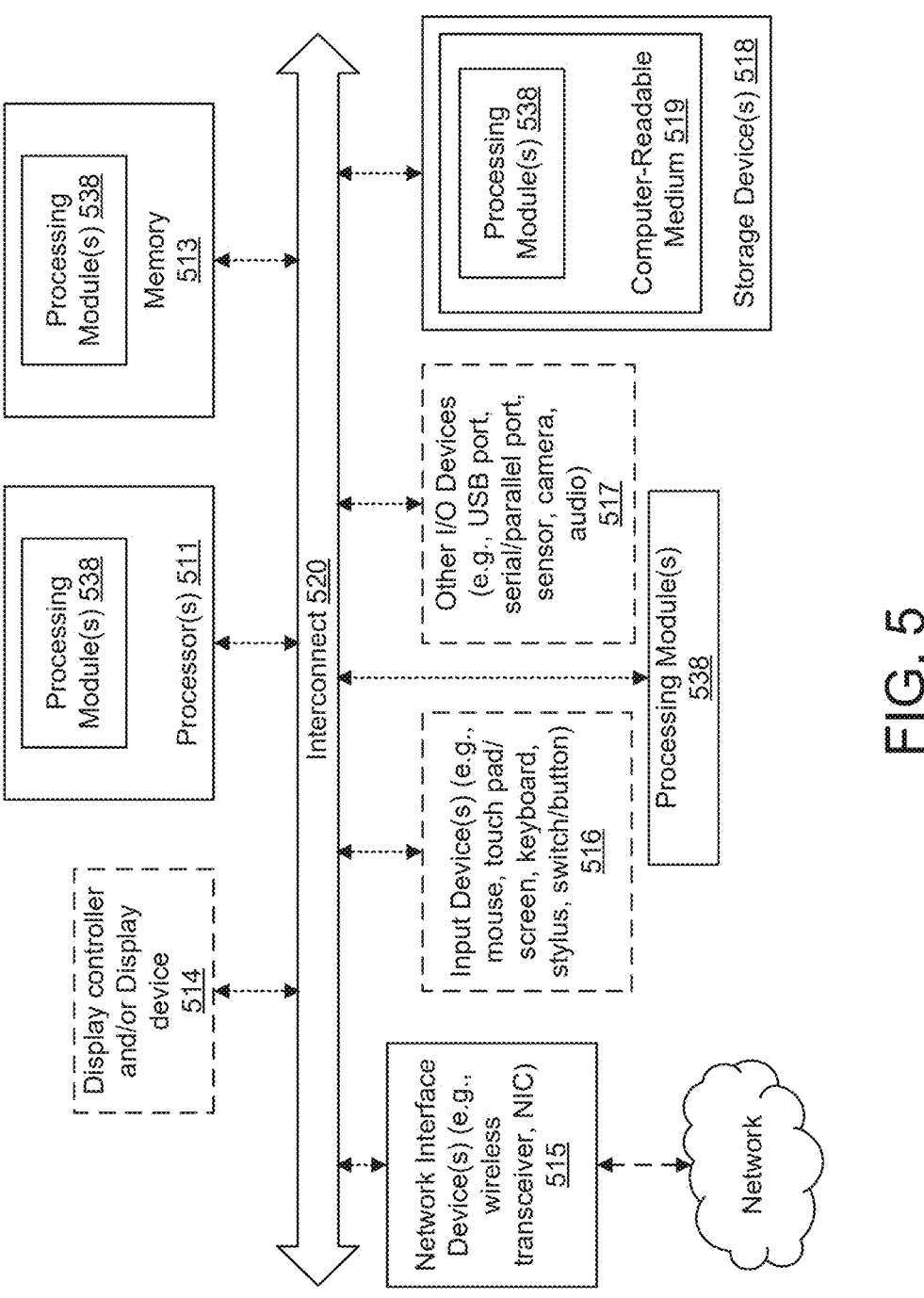
FIG. 5 shows a block diagram illustrating a data processing system in accordance with an embodiment.

Any of the components illustrated in FIG. 1 may be implemented with one or more computing devices. Turning to FIG. 5, a block diagram illustrating an example of a data processing system (e.g., a computing device) in accordance with an embodiment is shown. For example, system 510 may represent any of data processing systems described above performing any of the processes or methods described above. System 510 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 510 is intended to show a high-level view of many components of the computer system. However, it is to be understood that additional components may be present in certain implementations and furthermore, different arrangement of the components shown may occur in other implementations. System 510 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 510 includes processor 511, memory 513, and devices 515-517 via a bus or an interconnect 520. Processor 511 may represent a single processor or multiple processors with a single processor core or multiple processor cores included therein. Processor 511 may represent one or more general-purpose processors such as a microprocessor, a central processing unit (CPU), or the like. More particularly, processor 511 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 511 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 511, which may be a low power multi-core processor socket such as an ultra-low voltage processor, may act as a main processing unit and central hub for communication with the various components of the system. Such processor can be implemented as a system on chip (SoC). Processor 511 is configured to execute instructions for performing the operations discussed herein. System 510 may further include a graphics interface that communicates with optional graphics subsystem 514, which may include a display controller, a graphics processor, and/or a display device.

Processor 511 may communicate with memory 513, which in one embodiment can be implemented via multiple memory devices to provide for a given amount of system memory. Memory 513 may include one or more volatile storage (or memory) devices such as random-access memory (RAM), dynamic RAM (DRAM), synchronous DRAM (SDRAM), static RAM (SRAM), or other types of storage devices. Memory 513 may store information including sequences of instructions that are executed by processor 511, or any other device. For example, executable code and/or data of a variety of operating systems, device drivers, firmware (e.g., input output basic system or BIOS), and/or applications can be loaded in memory 513 and executed by processor 511. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 510 may further include IO devices such as devices (e.g., 515, 516, 517, 518) including network interface device(s) 515, optional input device(s) 516, and other optional IO device(s) 517. Network interface device(s) 515 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 515 may include a mouse, a touch pad, a touch sensitive screen (which may be integrated with a display device of optional graphics subsystem 514), a pointer device such as a stylus, and/or a keyboard (e.g., physical keyboard or a virtual keyboard displayed as part of a touch sensitive screen). For example, input device(s) 515 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity data collector arrays or other elements for determining one or more points of contact with the touch screen.

IO devices 517 may include an audio device. An audio device may include a speaker and/or a microphone to facilitate voice-enabled functions, such as voice recognition, voice replication, digital recording, and/or telephony functions. Other IO devices 517 may further include universal serial bus (USB) port(s), parallel port(s), serial port(s), a printer, a network interface, a bus bridge (e.g., a PCI-PCI bridge), data collector(s) (e.g., a motion data collector such as an accelerometer, gyroscope, a magnetometer, a light data collector, compass, a proximity data collector, etc.), or a combination thereof. IO device(s) 517 may further include an imaging processing subsystem (e.g., a camera), which may include an optical data collector, such as a charged coupled device (CCD) or a complementary metal-oxide semiconductor (CMOS) optical data collector, utilized to facilitate camera functions, such as recording photographs and video clips. Certain data collectors may be coupled to interconnect 520 via a data collector hub (not shown), while other devices such as a keyboard or thermal data collector may be controlled by an embedded controller (not shown), dependent upon the specific configuration or design of system 510.

To provide for persistent storage of information such as data, applications, one or more operating systems and so forth, a mass storage (not shown) may also couple to processor 511. In various embodiments, to enable a thinner and lighter system design as well as to improve system responsiveness, this mass storage may be implemented via a solid-state device (SSD). However, in other embodiments, the mass storage may primarily be implemented using a hard disk drive (HDD) with a smaller amount of SSD storage to act as an SSD cache to enable non-volatile storage of context state and other such information during power down events so that a fast power up can occur on re-initiation of system activities. Also, a flash device may be coupled to processor 511, e.g., via a serial peripheral interface (SPI). This flash device may provide for non-volatile storage of system software, including a basic input/output software (BIOS) as well as other firmware of the system.

Storage device 518 may include computer-readable storage medium 519 (also known as a machine-readable storage medium or a computer-readable medium) on which is stored one or more sets of instructions or software (e.g., processing module, unit, and/or processing module/unit/logic 538) embodying any one or more of the methodologies or functions described herein. Processing module/unit/logic 538 may represent any of the components described above. Processing module/unit/logic 538 may also reside, completely or at least partially, within memory 513 and/or within processor 511 during execution thereof by system 510, memory 513 and processor 511 also constituting machine-accessible storage media. Processing module/unit/logic 538 may further be transmitted or received over a network via network interface device(s) 515.

Computer-readable storage medium 519 may also be used to store some software functionalities described above persistently. While computer-readable storage medium 519 is shown in an exemplary embodiment to be a single medium, the term "computer-readable storage medium" should be taken to include a single medium or multiple media (e.g., a centralized or distributed database, and/or associated caches and servers) that store the one or more sets of instructions.

The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 538, components and other features described herein can be implemented as discrete hardware components or integrated in the functionality of hardware components such as ASICS, FPGAs, DSPs or similar devices. In addition, processing module/unit/logic 538 can be implemented as firmware or functional circuitry within hardware devices. Further, processing module/unit/logic 538 can be implemented in any combination hardware devices and software components.

Note that while system 510 is illustrated with various components of a data processing system, it is not intended to represent any particular architecture or manner of interconnecting the components as such details are not germane to embodiments disclosed herein. It will also be appreciated that network computers, handheld computers, mobile phones, servers, and/or other data processing systems which have fewer components, or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A non-transitory machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g., circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing use of inference models, the method comprising:

identifying an occurrence of an inference model deployment event for a location;

based on the occurrence, making a determination regarding whether the location is trustworthy;

in a first instance of the determination in which the location is not trustworthy:

selecting, from a model repository, an input data attack resistant inference model, the input data attack resistant inference model being trained to impart reconstruction resistance to, at least, input features during inference generation based on a schema for weighting, at least, the input features for reconstruction resistance;

initiating deployment of a prediction head portion of the input data attack resistant inference model to the location and a shared body portion of the input data attack resistant inference model to a second location that is trustworthy;

obtaining, at the location, an inference model result using the prediction head portion and the shared body portion; and providing computer-implemented services based on the inference model result.

2. The method of claim 1, wherein the schema for weighting, at least, the input features for reconstruction resistance indicates a reconstruction score threshold for an input feature of the input features based on a level of sensitivity for the input feature, the level of sensitivity being based on a level of impact of undesired access to the input feature.

3. The method of claim 2, wherein the reconstruction score threshold indicates an acceptable degree of reconstructability for the input feature and the reconstruction score threshold decreases as the level of sensitivity for the input feature increases.

4. The method of claim 3, wherein the level of sensitivity increases as information content of the input feature increases.

5. The method of claim 4, wherein the information content is based on at least one of variability of the input feature, and public accessibility of information regarding the input feature.

6. The method of claim 1, wherein the schema for weighting, at least, the input features for reconstruction resistance indicates a reconstruction score threshold for a portion of derived data based on at least one of the input features.

7. The method of claim 6, wherein the portion of the derived data is not used as input to the input data attack resistant inference model and is not output by the input data attack resistant inference model.

8. The method of claim 1, further comprising:

prior to identifying the occurrence of the inference model deployment event:

obtaining a multipath inference model comprising:

a first inference generation path comprising the prediction head portion and the shared body portion; and a second inference generation path comprising a reconstruction head portion and the shared body portion, the second inference generation path being trained to infer input features ingested by the second inference generation path;

obtaining, using the schema, a set of reconstruction score thresholds associated with at least the input features;

performing, based on the set of the reconstruction score thresholds, an untraining process for the second inference generation path to reduce an ability of the second inference generation path to infer the input features and to update the shared body portion;

performing a first training process for the first inference generation path while the updated shared body portion is frozen to obtain an updated prediction head portion; and using the updated prediction head portion and the updated shared body portion as the input data attack resistant inference model.

9. The method of claim 8, wherein obtaining the multipath inference model comprises:

freezing the shared body portion; and while the shared body portion is frozen:

performing a second training process using a second training data set to obtain the second inference generation path.

10. The method of claim 9, wherein while the shared body portion is frozen, values of weights of hidden layers of the shared body portion are not modified during the second training process.

11. The method of claim 10, wherein the values of the weights of the hidden layers of the shared body portion are set during a previously performed training process completed prior to the shared body portion being frozen and the previously performed training process using a first training data set to obtain the first inference generation path.

12. The method of claim 8, wherein obtaining the set of the reconstruction score thresholds comprises:

obtaining a test data set comprising instances of the input features;

performing, using the test data set, an input feature sensitivity analysis process to obtain levels of sensitivity for, at least, the input features; and assigning reconstruction score thresholds to, at least, each input feature of the input features based on the levels of sensitivity.

13. The method of claim 8, wherein performing the untraining process comprises:

performing a third training process using a second training data set to obtain an updated shared body portion and to reduce the ability of the second inference generation path to infer, at least, the input features;

freezing the updated shared body portion; and while the updated shared body portion is frozen:

performing a fourth training process using the second training data set to increase the ability of the second inference generation path to infer, at least, the input features and obtain an updated reconstruction head portion.

14. The method of claim 13, wherein performing the untraining process further comprises:

making a determination, using the updated shared body portion and the updated reconstruction head portion, regarding whether a reconstruction score for a first input feature of the input features falls below a reconstruction score threshold associated with the first input feature; and in an instance of the determination in which the reconstruction score falls below the reconstruction score threshold:

concluding that the updated shared body portion is to be used to update the first inference generation path.

15. The method of claim 1, wherein the second location has access to input data for the inference model and the location does not have access to the input data.

16. The method of claim 1, wherein the model repository comprises:

at least one input data attack resistant inference model; and at least one non-input data attack resistant inference model.

17. A non-transitory machine-readable medium having instructions stored therein, which when executed by a processor, cause the processor to perform operations for managing use of inference models, the operations comprising:

identifying an occurrence of an inference model deployment event for a location;

based on the occurrence, making a determination regarding whether the location is trustworthy;

in a first instance of the determination in which the location is not trustworthy:

selecting, from a model repository, an input data attack resistant inference model, the input data attack resistant inference model being trained to impart reconstruction resistance to, at least, input features during inference generation based on a schema for weighting, at least, the input features for reconstruction resistance;

initiating deployment of a prediction head portion of the input data attack resistant inference model to the location and a shared body portion of the input data attack resistant inference model to a second location that is trustworthy;

obtaining, at the location, an inference model result using the prediction head portion and the shared body portion; and providing computer-implemented services based on the inference model result.

18. The non-transitory machine-readable medium of claim 17, wherein the schema for weighting, at least, the input features for reconstruction resistance indicates a reconstruction score threshold for an input feature of the input features based on a level of sensitivity for the input feature, the level of sensitivity being based on a level of impact of undesired access to the input feature.

19. A data processing system, comprising:

a processor; and a memory coupled to the processor to store instructions, which when executed by the processor, cause the processor to perform operations for managing use of inference models, the operations comprising:

identifying an occurrence of an inference model deployment event for a location;

based on the occurrence, making a determination regarding whether the location is trustworthy;

in a first instance of the determination in which the location is not trustworthy:

selecting, from a model repository, an input data attack resistant inference model, the input data attack resistant inference model being trained to impart reconstruction resistance to, at least, input features during inference generation based on a schema for weighting, at least, the input features for reconstruction resistance;

initiating deployment of a prediction head portion of the input data attack resistant inference model to the location and a shared body portion of the input data attack resistant inference model to a second location that is trustworthy;

obtaining, at the location, an inference model result using the prediction head portion and the shared body portion; and providing computer-implemented services based on the inference model result.

20. The data processing system of claim 19, wherein the schema for weighting, at least, the input features for reconstruction resistance indicates a reconstruction score threshold for an input feature of the input features based on a level of sensitivity for the input feature, the level of sensitivity being based on a level of impact of undesired access to the input feature.

\* \* \* \* \*